United States Patent [19]
Back et al.

[11] 4,193,916
[45] Mar. 18, 1980

[54] SULFO- OR CARBOXY-ARYL AMINO SULFONYL PHENYL AZO HYDROXPYRIDINE HEAVY METAL COMPLEX DYES

[75] Inventors: Gerhard Back, Lorrach, Fed. Rep. of Germany; Alfred Fasciati, Bottmingen, Switzerland

[73] Assignee: Ciba-Geigy Corporation, Ardsley, N.Y.

[21] Appl. No.: 837,138

[22] Filed: Sep. 28, 1977

[30] Foreign Application Priority Data

Oct. 8, 1976 [LU] Luxembourg ............................ 75958
Feb. 7, 1977 [LU] Luxembourg ............................ 76713

[51] Int. Cl.² .................... C09B 45/16; C09B 45/18; C09B 45/20; C09B 45/22
[52] U.S. Cl. ................................. 260/146 R; 260/156
[58] Field of Search ............ 260/146 R, 146 D, 146 T, 260/153, 154, 156

[56] References Cited

U.S. PATENT DOCUMENTS

| | | | |
|---|---|---|---|
| 3,869,440 | 3/1975 | Back et al. | 260/146 R |
| 3,870,695 | 3/1975 | Back et al. | 260/146 R |
| 3,971,738 | 7/1976 | Fasciati et al. | 260/146 R |

FOREIGN PATENT DOCUMENTS

| | | | |
|---|---|---|---|
| 1476807 | 6/1977 | United Kingdom | 260/146 R |
| 1479948 | 7/1977 | United Kingdom | 260/146 R |

Primary Examiner—Floyd D. Higel
Attorney, Agent, or Firm—Michael W. Glynn

[57] ABSTRACT

A heavy metal complex of an azo compound of the formula

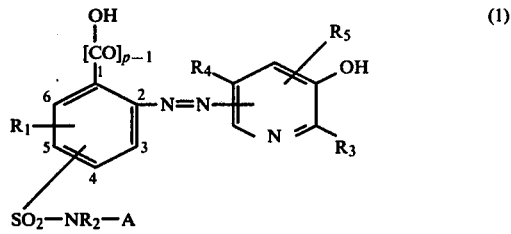

in which A is a substituted or unsubstituted carboxy- or sulpho-phenyl radical or a carboxy- or sulpho- naphthyl radical, p is 1 or 2, $R_1$ is hydrogen, chlorine, bromine, nitro, alkyl, alkoxy, aryloxy or acylamino, $R_2$ is hydrogen or alkyl, $R_3$ is hydroxyl or amino, $R_4$ is hydrogen, chlorine, bromine, cyano, amino, amino substituted by 1 or 2 alkyl radicals, arylamino, morpholino, pyrrolidino, piperidino, mercapto, alkylthio, arylthio, sulpho or arylsulphonyl and $R_5$ is hydrogen, chlorine or bromine and one of the radicals $R_1$ and $-SO_2-NR_2-A$ is bonded to the benzene ring in the 4-position and the other is bonded to the benzene ring in the 5-position or 6-position, and 1 or 2 molecules of the azo compound of the formula (1) are bonded to one atom of copper, nickel, chromium or cobalt; such dyes being suitable for dyeing and printing polyamide materials, such as wool, silk, leather and synthetic polyamides.

6 Claims, No Drawings

SULFO- OR CARBOXY-ARYL AMINO SULFONYL PHENYL AZO HYDROXPYRIDINE HEAVY METAL COMPLEX DYES

The present invention relates to heavy metal complexes of azo compounds of the formula

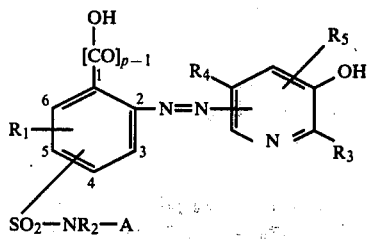

in which A is a substituted or unsubstituted carboxy- or sulpho-phenyl radical or a carboxy- or sulpho-naphthyl radical, p is 1 or 2, $R_1$ is hydrogen, chlorine, bromine, nitro, alkyl, alkoxy, aryloxy or acylamino, $R_2$ is hydrogen or alkyl, $R_3$ is hydroxyl or amino, $R_4$ is hydrogen, chlorine, bromine, cyano, amino, amino substituted by 1 or 2 alkyl radicals, arylamino, morpholino, pyrrolidino, piperidino, mercapto, alkylthio, arylthio, sulpho or arylsulphonyl and $R_5$ is hydrogen, chlorine or bromine and one of the radicals $R_1$ and $-SO_2NR_2-A$ is bonded to the benzene ring in the 4-position and the other is bonded to the benzene ring in the 5-position or 6-position.

Possible substituents of the radical A are, in particular, chlorine, bromine and nitro, trifluoromethyl, alkyl, alkoxy and acylamino groups.

In the present context, "alkyl", "alkoxy" and "acylamino" mean low-molecular radicals, especially those having 1 to 4 carbon atoms. The term "acylamino" in the present context in particular signifies alkanoylamino and alkoxycarbonylamino. Such radicals are, for example, methyl, ethyl, isopropyl, methoxy, acetylamino, methoxycarbonylamino or propionylamino. These radicals can also be substituted if desired. The term "aryl" in particular signifies the phenyl radical, and also phenyl radicals substituted by chlorine, bromine, methyl, methoxy or nitro.

The novel dyes are prepared by reacting an azo compound of the formula (1) with heavy metal donors and, if $R_4$ is chlorine or bromine, reacting the metal complex if desired with ammonia, an alkylamine or arylamine or an alkali metal sulphide, alkali metal cyanide, alkali metal sulphite or alkali metal arylsulphinate or with an alkyl- or aryl-mercaptan, and, if $R_5$ is hydrogen, treating the dye, if desired, with chlorinating agents or brominating agents.

Suitable heavy metals are, in particular, copper, nickel, cobalt or chromium. The customary salts or complex compounds of these metals are used, for example copper sulphate, copper acetate or copper complexes of aliphatic aminocarboxylic acids, hydroxycarboxylic acids or di- or tri-carboxylic acids or of aromatic hydroxycarboxylic acids, such as copper complexes of glycocol, of lactic acid, oxalic acid, citric acid or salicylic acid and, in particular, of tartaric acid; nickel sulphate, cobalt-II sulphate, cobalt-II acetate and freshly precipitated cobalt-II hydroxide, chromium-III chloride, chromium-III formate and also complex chromium compounds of aliphatic dicarboxylic acids or hydroxycarboxylic acids or of aromatic hydroxycarboxylic acids. Chromium-VI compounds, such as alkali metal chromates, can also be used if the reaction mixture contains a reducing agent (for example butanol or glucose).

The reaction with the heavy metal donors is effected by conventional processes and, depending on the solubility of the components, in various solvents, for example water, ethanol, formamide, glycol ethers, pyridine or others, if appropriate at elevated temperature, in a weakly acid to alkaline medium and in such a way that metal complexes are formed which contain one atom or half an atom of the metal in a complex bond per molecule of azo compound. 1:1 copper complexes, 1:1 nickel complexes, 1:2 nickel complexes, 1:1 chromium complexes, 1:2 chromium complexes and 1:2 cobalt complexes are obtained in this way.

The 1:1 copper complexes and the 1:1 nickel complexes of the dyes of the formula (1) are particularly preferred.

The reaction is carried out at room temperature or, advantageously, with heating, in an open vessel or under pressure and if appropriate in the presence of suitable additives, for example salts of organic acids, bases or other agents which promote the formation of a complex. The pH conditions are determined by the nature of the metallisation process; for example coppering is carried out under weakly acid conditions with copper sulphate but under alkaline conditions with copper tetramine-sulphate.

In the case of 1:2 complexes, the two azo dyes which are bonded to the same metal atom can be of the formula (1). They are then preferably identical compounds. Symmetrical complexes of this type have nickel or, especially, cobalt as the metal atom. However, one of the azo dyes present in 1:2 complexes can also be another metallisable dye and in this case is preferably an azo dye free from sulpho groups. Suitable azo dyes are, especially, those obtained from a diazo component of the aminophenol series and a coupling component of the phenol, naphthol, naphthylamine, acetoacetic acid amide, 5-pyrazolone or 6-hydroxypyridone series. Asymmetrical complexes of this type, which are single compounds, are possible, in particular, in the case of 1:2 chromium complexes. They are prepared by first forming the 1:1 chromium complex of one dye by known methods and subsequently adding the second dye molecule onto this. The 1:1 chromium complex can be prepared either with the dye of the formula (1) or with the azo compound containing a coupling component other than a 3-hydroxypyridine.

The starting materials of the formula (1) are novel and are prepared in a conventional manner by diazotising an amine of the formula

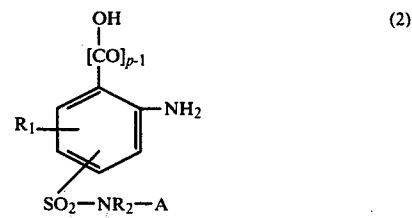

and coupling the diazo compound with a coupling component of the formula

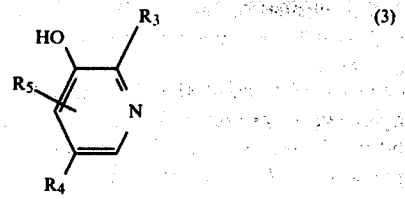

(3)

The symbols $R_1$, $R_2$, $R_3$, $R_4$, $R_5$, p and A are as defined in formula (1).

The coupling components used are, in particular, 2-amino-3-hydroxypyridine and 2,3-dihydroxypyridine. Further suitable coupling components are 2,3-dihydroxy-5-chloro- and -5-bromo-pyridine and also, especially, the compounds obtainable from these compounds by replacing the halogen atom by a cyano, amino, alkylamino, arylamino, mercapto, alkylthio, arylthio, sulpho or arylsulphonyl group. The halogen atom in the 5-position can be replaced only after azo coupling, but before or after metallisation.

Replacement can be effected, for example, using sodium cyanide, ammonia, ethylamine, butylamine, dimethylamine, ethanolamine, benzylamine, morpholine, piperidine, pyrrolidine, aniline, p-anisidine, anthranilic acid, p-aminoacetanilide, thioglycol, thiophenol, thio-2-naphthol, thiosalicylic acid or sodium sulphite and also using the sodium salts of aromatic sulphinic acids, for example of p-toluenesulphinic acid.

The reaction is appropriately carried out in aqueous solution and, in the case of weakly acid to weakly alkaline reaction, with moderate warming if appropriate.

If $R_5$ is hydrogen and is to be replaced by chlorine or bromine, either the metal-free azo dye or the metal complex can be reacted with chlorinating agents or brominating agents. The halogenation is carried out in anhydrous organic solvents, for example in glycol ethers, and the halogenating agents used are, in particular, chlorine and bromine. The reaction is appropriately carried out under the process conditions indicated in German Offenlegungsschrift No. 2,450,911 and using the solvents and halogenating agents indicated in that Offenlegungsschrift.

All of the possible carboxyphenylsulphamides, sulphophenylsulphamides, carboxynaphthylsulphamides and sulphonaphthylsulphamides from the series of the 1-hydroxy- or 1-carboxy-2-aminobenzene-sulphonic acids can be used as the diazo component. In particular, the 1-hydroxy-2-aminobenzenesulphophenylamides are preferred. The sulphophenylamide radical can carry the sulpho group in the o-, m- or p-position. The sulphanilide-carboxylic acid group or sulphonaphthylamidecarboxylic acid group can be in the 4-, 5- or 6-position of the 1-hydroxy- or 1-carboxy-2-aminobenzene radical, which in addition can also carry a further non-ionic substituent. In this case, either the sulphamide group or the further substituent is in the 4-position.

Diazo components of the formula

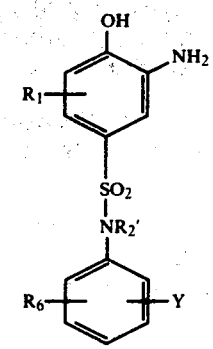

(4)

in which Y is the carboxyl or sulpho group, $R_1$ and $R_2$ are as defined for formula (1) and $R_6$ is hydrogen, chlorine, bromine, $C_1-C_4$-alkyl, $C_1-C_4$-alkoxy or acylamino, especially $C_1-C_4$-alkanoylamino, are of particular interest. $R_6$ is preferably hydrogen or chlorine.

The most important diazo components are those of the formula

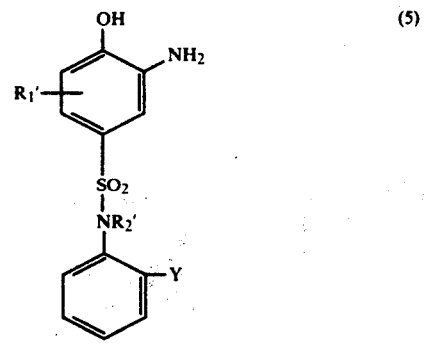

(5)

in which Y is the carboxyl or sulpho group, $R_1'$ is hydrogen, chlorine, bromine, methyl, methoxy, nitro or acetylamino and $R_2'$ is methyl or, in particular, hydrogen.

The novel dyes are suitable for dyeing and printing polyamide materials, for example wool, silk, leather and, in particular, synthetic polyamides. The dyes are applied by conventional processes, for example from a bath containing acetic acid to a neutral bath. If the metal complexes are those having 2 or more sulpho groups, a levelling assistant is appropriately added to the dyebath.

Instead of using the prepared metal complexes, it is also possible to apply the metal-free azo dyes of the formula (1) to the material to be dyed and to allow metal donors, for example copper salts or cobalt salts, to act on the material treated with the dyes.

The dyeings and prints obtainable with the novel dyes are distinguished by good fastness to wet processing (for example fastness to washing, milling, perspiration and hot water), by resistance to acids and alkalis, and by good fastness to rubbing and fastness to light. The dyes have a good affinity and build-up and good stability, especially also in the presence of acid, and give level dyeings. They have very bright, brilliant shades and as a rule their appearance does not change in artificial light. They are, in particular, also suitable for dyeing in combination with other dyes, which can be either metal-containing or metal-free.

In the examples which follow parts are parts by weight, percentages are percentages by weight and the temperatures are given in degrees Centigrade.

EXAMPLE 1

A solution of 30.8 parts of 1-hydroxy-2-aminobenzene-4-sulphonic acid N-2'-carboxyphenylamide in 200 parts of water and 20 parts of 40% strength sodium hydroxide solution is mixed with 25 parts of 4 N sodium nitrite solution and this mixture is added dropwise, with stirring, to a mixture of 45 parts of 30% strength hydrochloric acid and 150 parts of ice-water.

The yellow suspension of the diazonium compound, which is thus obtained, is approximately neutralised with 15% strength sodium hydroxide solution and treated with a solution of 11.2 parts of 2-amino-3-hydroxypyridine in 100 parts of water. The suspension is rendered alkaline by introducing 15 parts of calcium hydroxide and the coupling reaction to give the violet monoazo dye of the following probable constitution starts immediately.

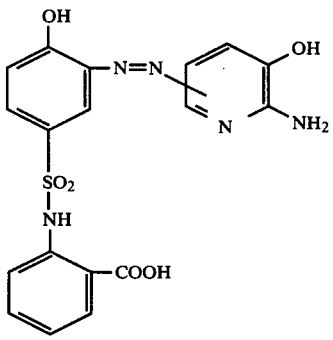

After the coupling reaction has ended, the dye formed is precipitated by acidifying the mixture with 50 parts of 30% strength hydrochloric acid and is isolated by filtration and washed with 5% strength hydrochloric acid.

The amount of filter paste corresponding to 42.9 parts of the monoazo dye of the above constitution is stirred with 500 parts of hot water and brought into solution by adding 40% strength sodium hydroxide solution until there is a permanent alkaline reaction. 25 parts of copper sulphate pentahydrate in the form of a 20% strength solution are added dropwise, with stirring, at a temperature of 65° to 70° C., the pH always being kept within a range of 8 to 9 by adding 15% strength sodium hydroxide solution at the same time. The 1:1 copper complex of the monoazo dye forms immediately, the colour changing from red-violet to blue. As soon as the metallisation has ended, the complex dye is precipitated by adding sodium chloride, isolated by filtration, washed with dilute sodium chloride solution and dried in vacuo at 90° C. After grinding, the novel dye is in the form of a dark powder, which readily dissolves in water to give a blue colour shade, and dyes polyamide fibres or wool from a weakly acid bath in sky blue shades with very good fastness properties.

If the metallisation of the monoazo dye is carried out under the same conditions using 28 parts of crystalline nickel sulphate in place of copper sulphate, the corresponding 1:1 nickel complex forms and this dyes polyamide fibres in fast, reddish-tinged blue shades.

With only 14 parts of crystalline nickel sulphate, the corresponding 1:2 nickel complex, which dyes polyamide fibres from a weakly acid bath in even more distinctly reddish-tinged blue shades, forms under otherwise unchanged metallisation conditions.

In order to prepare the diazotisation component, 2-nitro-1-chlorobenzene-4-sulphonyl chloride, which is obtainable by a known process, is reacted with anthranilic acid, the halogen in the resulting 2-nitro-1-chlorobenzene-4-sulphonic acid anthranil is converted to the hydroxyl group by boiling with aqueous sodium hydroxide solution and the nitro group is then reduced to the amino group using sodium sulphide solution.

EXAMPLE 2

42.9 parts of the monoazo dye obtained according to Example 1 are mixed to a paste with 300 parts of hot water and brought into solution by adding 40% strength sodium hydroxide solution until there is a permanent alkaline reaction. While maintaining a temperature of 80° to 85° C., 14.1 parts of crystalline cobalt-II sulphate in the form of a 25% strength solution are added, an alkaline reaction always being maintained by the dropwise addition of 15% strength sodium hydroxide solution. The 1:2 cobalt complex forms immediately, the colour changing from red-violet to green-blue, and after metallisation is complete this complex is separated out by introducing sodium chloride and neutralising the mixture with 15% strength hyrochloric acid.

After filtering, washing with sodium chloride solution, drying and grinding, the novel complex dye is in the form of a dark powder which is readily soluble in water; it dyes polyamide fibres and wool in greenish-tinged blue shades with very good fastness to light.

EXAMPLE 3

A solution of 30.8 parts of 1-hydroxy-2-aminobenzene-5-sulphonic acid N-2'-carboxyphenylamide in 200 parts of water and 20 parts of 40% strength sodium hydroxide solution is mixed with 25 parts of 4 N sodium nitrite solution and the mixture is added dropwise, with stirring, to a mixture of 45 parts of 30% strength hydrochloric acid and 150 parts of ice-water.

The yellow suspension of the diazonium compound, which is thus obtained, is approximately neutralised with 15% strength sodium hydroxide solution and treated with a solution of 11.2 parts of 2-amino-3-hydroxypyridine in 100 parts of water. The suspension is rendered alkaline by introducing 15 parts of calcium hydroxide and the coupling reaction to give the violet monoazo dye of the following probable constitution takes place immediately:

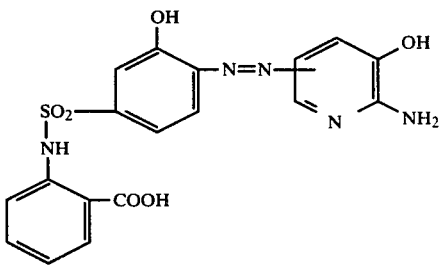

After the coupling reaction has ended, the dye formed is precipitated by acidifying the mixture with 50 parts of 30% strength hydrochloric acid and is isolated by filtration and washed with 5% strength hydrochloric acid.

The amount of filter paste which corresponds to 42.9 parts of the monoazo dye of the above constitution is stirred with 500 parts of hot water and brought into solution by adding 40% strength sodium hydroxide solution until there is a permanent alkaline reaction. 25 parts of copper sulphate pentahydrate in the form of a 20% strength solution are added dropwise, with stirring, at a temperature of 65° to 70° C., the pH always being kept within a range of 8 to 9 by adding 15% strength sodium hydroxide solution at the same time. The 1:1 copper complex of the monoazo dye forms immediately, the colour changing from red-violet to blue. As soon as the metallisation has ended, the complex dye is precipitated by adding sodium chloride, isolated by filtration, washed with dilute sodium chloride solution and dried in vacuo at 90° C.

After grinding, the novel dye is in the form of a dark powder, which readily dissolves in water to give a blue colour shade, and dyes polyamide fibres or wool from a weakly acid bath in bright, greenish-tinged blue shades with very good fastness properties.

If the metallisation of the monoazo dye is carried out under the same conditions using 28 parts of crystalline nickel sulphate in place of copper sulphate, the corresponding 1:1 nickel complex forms and this dyes polyamide fibres in fast blue shades.

In order to prepare the diazotisation component used in the above dye, benzoxazolone-6-sulphonyl chloride, which is accessible in a known manner, is reacted with anthranilic acid and the resulting sulphanthranilide is saponified with 15% strength sodium hydroxide solution to give the free 2-aminophenol.

EXAMPLE 4

42.9 parts of the monoazo dye obtained according to Example 3 are mixed to a paste with 300 parts of hot water and brought into solution by adding 40% strength sodium hydroxide solution until there is a permanent alkaline reaction. While maintaining a temperature of 80° to 85° C., 14.1 parts of crystalline cobalt-II sulphate in the form of a 25% strength solution are added, an alkaline reaction always being maintained by the dropwise addition of 15% strength sodium hydroxide solution. The 1:2 cobalt complex forms immediately, the colour changing from red-violet to green-blue, and after complete metallisation this complex is separated out by introducing sodium chloride and neutralising the mixture with 15% strength hydrochloric acid.

After filtering, washing with sodium chloride solution, drying and grinding, the novel complex dye is in the form of a dark powder which is readily soluble in water; it dyes polyamide fibres and wool in strongly greenish-tinged blue shades with very good fastness to light.

EXAMPLE 5

A solution of 35.3 parts of 6-nitro-1-hydroxy-2-aminobenzene-4-sulphonic acid N-2'-carboxyphenylamide in 200 parts of water and 20 parts of 40% strength sodium hydroxide solution is mixed with 25 parts of 4 N sodium nitrite solution and this mixture is added dropwise, with stirring, to a mixture of 45 parts of 30% strength hydrochloric acid and 150 parts of ice-water.

The yellow suspension of the diazonium compound, which is thus obtained, is approximately neutralised with 15% strength sodium hydroxide solution and treated with a solution of 11.2 parts of 2-amino-3-hydroxypyridine in 100 parts of water. The suspension is rendered alkaline by introducing 15 parts of calcium hydroxide and the coupling reaction to give the violet monoazo dye of the following probable constitution starts immediately:

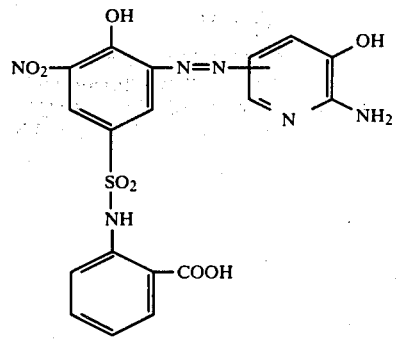

After the coupling reaction has ended, the dye formed is precipitated by acidifying the mixture with 50 parts of 30% strength hydrochloric acid and is isolated by filtration and washed with 5% strength hydrochloric acid.

The amount of filter paste which corresponds to 47.4 parts of the monoazo dye of the above constitution is stirred with 500 parts of hot water and brought into solution by adding 40% strength sodium hydroxide solution until there is a permanent alkaline reaction. 25 parts of copper sulphate pentahydrate in the form of a 20% strength solution are added dropwise, with stirring, at a temperature of 65° to 70° C., the pH always being kept within a range of 8 to 9 by adding 15% strength sodium hydroxide solution at the same time. The 1:1 copper complex of the monoazo dye forms immediately, the colour changing from red-violet to blue. As soon as the metallisation has ended, the complex dye is precipitated by adding sodium chloride, isolated by filtration, washed with dilute sodium chloride solution and dried in vacuo at 90° C.

After grinding, the novel dye is in the form of a dark powder, which readily dissolves in water to give a blue colour shade, and dyes polyamide fibres or wool from a weakly acid bath in bright greenish-tinged blue shades with very good fastness properties.

If the metallisation of the monoazo dye is carried out under the same conditions using 28 parts of crystalline nickel sulphate in place of copper sulphate, the corresponding 1:1 nickel complex forms and this dyes polyamide fibres in fast blue shades.

Under the same conditions, metallisation with only 14 parts of crystalline nickel sulphate gives the 1:2 nickel complex, which dyes polyamide fibres from a weakly acid bath in fast, reddish-tinged blue shades.

EXAMPLE 6

47.4 parts of the monoazo dye obtained according to Example 5 are mixed to a paste with 300 parts of hot water and brought into solution by adding 40% strength sodium hydroxide solution until there is a permanent alkaline reaction. While maintaining a temperature of 80° to 85° C., 14.1 parts of crystalline cobalt-II sulphate in the form of a 25% strength solution are added, an alkaline reaction always being maintained by the dropwise addition of 15% strength sodium hydroxide solution. The 1:2 cobalt complex forms immediately, the colour changing from red-violet to blue-green, and after complete metallisation this is separated out by introducing sodium chloride and neutralising the mixture with 15% strength hydrochloric acid.

After filtering, washing with sodium chloride solution, drying and grinding, the novel complex dye is in the form of a dark powder which is readily soluble in water; it dyes polyamide fibres and wool in full blue-green shades with very good fastness to light.

EXAMPLE 7

A solution of 34.25 parts of 4-chloro-1-hydroxy-2-aminobenzene-6-sulphonic acid N-2'-carboxyphenylamide in 200 parts of water and 20 parts of 40% strength sodium hydroxide solution is mixed with 25 parts of 4 N sodium nitrite solution and this mixture is added dropwise, with stirring, to a mixture of 45 parts of 30% strength hydrochloric acid and 150 parts of ice-water.

The yellow suspension of the diazonium compound, which is thus obtained, is approximately neutralised with 15% strength sodium hydroxide solution and treated with a solution of 11.2 parts of 2-amino-3-hydroxypyridine in 100 parts of water. The suspension is rendered alkaline by introducing 15 parts of calcium hydroxide and the coupling reaction to give the violet monoazo dye of the following probable constitution starts immediately:

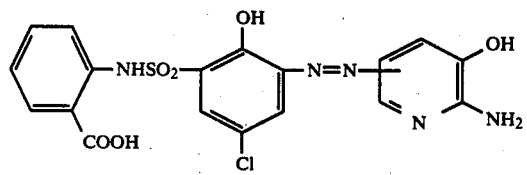

After the coupling reaction has ended, the dye formed is precipitated by acidifying the mixture with 50 parts of 30% strength hydrochloric acid and is isolated by filtration and washed with 5% strength hydrochloric acid.

The amount of filter paste which corresponds to 46.35 parts of the monoazo dye of the above constitution is stirred with 500 parts of hot water and brought into solution by adding 40% strength sodium hydroxide solution until there is a permanent alkaline reaction. 25 parts of copper sulphate pentahydrate in the form of a 20% strength solution are added dropwise, with stirring, at a temperature of 65° to 70° C., the pH always being kept within a range of 8 to 9 by adding 15% strength sodium hydroxide solution at the same time. The 1:1 copper complex of the monoazo dye forms immediately, the colour changing from red-violet to blue. As soon as the metallisation has ended, the complex dye is precipitated by adding sodium chloride, isolated by filtration, washed with dilute sodium chloride solution and dried in vacuo at 90° C.

After grinding, the novel dye is in the form of a dark powder, which readily dissolves in water to give a blue colour shade, and dyes polyamide fibres or wool from a weakly acid bath in sky blue shades with very good fastness properties.

If the metallisation of the monoazo dye is carried out under the same conditions using 28 parts of crystalline nickel sulphate in place of copper sulphate, the corresponding 1:1 nickel complex forms and this dyes polyamide fibres in fast, reddish-tinged blue shades.

EXAMPLE 8

46.35 parts of the monoazo dye obtained according to Example 7 are mixed to a paste with 300 parts of hot water and brought into solution by adding 40% strength sodium hydroxide solution until there is a permanent alkaline reaction. While maintaining a temperature of 80° to 85° C., 14.1 parts of crystalline cobalt-II sulphate in the form of a 25% strength solution are added, an alkaline reaction always being maintained by the dropwise addition of 15% strength sodium hydroxide solution. The 1:2 cobalt complex forms immediately, the colour changing from red-violet to green-blue, and after complete metallisation this is separated out by introducing sodium chloride and neutralising the mixture with 15% strength hydrochloric acid.

After filtering, washing with sodium chloride solution, drying and grinding, the novel complex dye is in the form of a dark powder which is readily soluble in water; it dyes polyamide fibres and wool in greenish-tinged blue shades with very good fastness to light.

EXAMPLE 9

A solution of 32.2 parts of 1-hydroxy-2-aminobenzene-4-sulphonic acid N-methyl-N-2'-carboxyphenylamide in 200 parts of water and 20 parts of 40% strength sodium hydroxide solution is mixed with 25 parts of 4 N sodium nitrite solution and this mixture is added dropwise, with stirring, to a mixture of 45 parts of 30% strength hydrochloric acid and 150 parts of ice-water.

The yellow suspension of the diazonium compound, which is thus obtained, is approximately neutralised with 15% strength sodium hydroxide solution and treated with a solution of 11.2 parts of 2-amino-3-hydroxypyridine in 100 parts of water. The suspension is rendered alkaline by introducing 15 parts of calcium hydroxide and the coupling reaction to give the violet monoazo dye of the following probable constitution starts immediately:

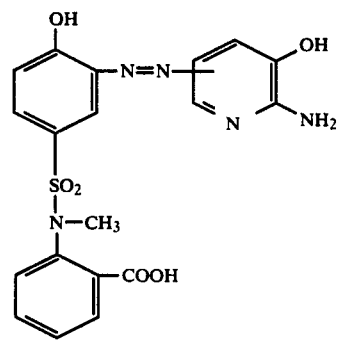

After the coupling reaction has ended, the dye formed is precipitated by acidifying the mixture with 50 parts of 30% strength hydrochloric acid and is isolated by filtration and washed with 5% strength hydrochloric acid.

The amount of filter paste which corresponds to 44.3 parts of the monoazo dye of the above constitution is stirred with 500 parts of hot water and brought into solution by adding 40% strength sodium hydroxide solution until there is a permanent alkaline reaction. 25 parts of copper sulphate pentahydrate in the form of a 20% strength solution are added dropwise, with stirring, at a temperature of 65° to 70° C., the pH always being kept within a range of 8 to 9 by adding 15% strength sodium hydroxide solution at the same time. The 1:1 copper complex of the monoazo dye forms immediately, the colour changing from red-violet to blue. As soon as the metallisation has ended, the complex dye is precipitated by adding sodium chloride, isolated by filtration, washed with dilute sodium chloride solution and dried in vacuo at 90° C.

After grinding, the novel dye is in the form of a dark powder, which readily dissolves in water to give a blue colour shade, and dyes polyamide fibres or wool from a weakly acid bath in sky blue shades with very good fastness properties.

If the metallisation of the monoazo dye is carried out under the same conditions using 28 parts of crystalline nickel sulphate in place of copper sulphate, the corresponding 1:1 nickel complex forms and this dyes polyamide fibres in fast, reddish-tinged blue shades.

Under the same conditions, metallisation with only 14 parts of crystalline nickel sulphate gives the 1:2 nickel complex, which dyes polyamide fibres from a weakly acid bath in fast, distinctly reddish-tinged blue shades.

EXAMPLE 10

44.3 parts of the monoazo dye obtained according to Example 9 are mixed to a paste with 300 parts of hot water and brought into solution by adding 40% strength sodium hydroxide solution until there is a permanent alkaline reaction. While maintaining a temperature of 80° to 85° C., 14.1 parts of crystalline cobalt-II sulphate in the form of a 25% strength solution are added, an alkaline reaction always being maintained by the dropwise addition of 15% strength sodium hydroxide solution. The 1:2 cobalt complex forms immediately, the colour changing from red-violet to green-blue, and after complete metallisation this complex is separated out by introducing sodium chloride and neutralising the mixture with 15% strength hydrochloric acid.

After filtering, washing with sodium chloride solution, drying and grinding, the novel complex dye is in the form of a dark powder which is readily soluble in water; it dyes polyamide fibres and wool in greenish-tinged blue shades with very good fastness to light.

EXAMPLE 11

A solution of 35.3 parts of 6-nitro-1-hydroxy-2-aminobenzene-4-sulphonic acid N-2'-carboxyphenylamide in 200 parts of water and 20 parts of 40% strength sodium hydroxide solution is mixed with 25 parts of 4 N sodium nitrite solution and this mixture is added dropwise, with stirring, to a mixture of 45 parts of 30% strength hydrochloric acid and 150 parts of ice-water.

The yellow suspension of the diazonium compound, which is thus obtained, is approximately neutralised with 15% strength sodium hydroxide solution and treated with a solution of 19.2 parts of 2,3-dihydroxy-5-bromopyridine in 100 parts of water. The suspension is rendered alkaline by introducing 15 parts of calcium hydroxide and the coupling reaction to give the violet monoazo dye of the following probable constitution starts immediately:

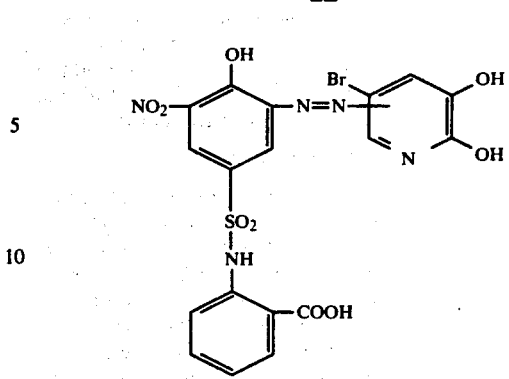

After the coupling reaction has ended, the dye formed is precipitated by acidifying the mixture with 50 parts of 30% strength hydrochloric acid and is isolated by filtration and washed with 5% strength hydrochloric acid.

The amount of filter paste which corresponds to 55.4 parts of the monoazo dye of the above constitution is stirred with 500 parts of hot water and brought into solution by adding 40% strength sodium hydroxide solution until there is a permanent alkaline reaction.

25 parts of copper sulphate pentahydrate in the form of a 20% strength solution are added dropwise, with stirring, at a temperature of 65° to 70° C., the pH always being kept within a range of 8 to 9 by adding 15% strength sodium hydroxide solution at the same time. The 1:1 copper complex of the monoazo dye forms immediately, the colour changing from red-violet to blue. As soon as the metallisation has ended, the complex dye is precipitated by adding sodium chloride, isolated by filtration, washed with dilute sodium chloride solution and dried in vacuo at 90° C. After grinding, the novel dye is in the form of a dark powder, which readily dissolves in water to give a blue colour shade, and dyes polyamide fibres or wool from a weakly acid bath in sky blue shades with very good fastness properties.

If the metallisation of the monoazo dye is carried out under the same conditions using 28 parts of crystalline nickel sulphate in place of copper sulphate, the corresponding 1:1 nickel complex forms and this dyes polyamide fibres in fast, reddish-tinged blue shades.

EXAMPLE 12

55.4 parts of the monoazo dye obtained according to Example 1 are mixed to a paste with 300 parts of hot water and brought into solution by adding 40% strength sodium hydroxide solution until there is a permanent alkaline reaction. While maintaining a temperature of 80° to 85° C., 14.1 parts of crystalline cobalt-II sulphate in the form of a 25% strength solution are added, an alkaline reaction always being maintained by the dropwise addition of 15% strength sodium hydroxide solution. The 1:2 cobalt complex forms immediately, the colour changing from red-violet to green-blue, and after complete metallisation this complex is separated out by introducing sodium chloride and neutralising the mixture with 15% strength hydrochloric acid.

After filtering, washing with sodium chloride solution, drying and grinding, the novel complex dye is in the form of a dark powder which is readily soluble in water; it dyes polyamide fibres and wool in full blue shades with very good fastness to light.

EXAMPLE 13

A solution of 35.2 parts of 1-carboxy-2-aminobenzene-5-sulphonic acid N-2'-carboxyphenylamide in 200 parts of water and 20 parts of 40% strength sodium hydroxide solution is mixed with 25 parts of 4 N sodium nitrite solution and this mixture is added dropwise, with stirring, to a mixture of 45 parts of 30% strength hydrochloric acid and 150 parts of ice-water.

The yellow suspension of the diazonium compound, which is thus obtained, is approximately neutralised with 15% strength sodium hydroxide solution and treated with a solution of 11.2 parts of 2-amino-3-hydroxypyridine in 100 parts of water. The suspension is rendered alkaline by introducing 15 parts of calcium hydroxide and the coupling reaction to give the violet monoazo dye of the following probable constitution takes place immediately:

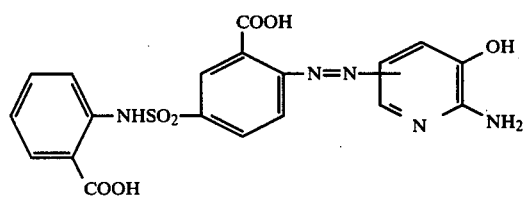

After the coupling reaction has ended, the dye formed is precipitated by acidifying the mixture with 50 parts of 30% strength hydrochloric acid and is isolated by filtration and washed with 5% strength hydrochloric acid.

The amount of filter paste which corresponds to 47.3 parts of the monoazo dye of the above constitution is stirred with 500 parts of hot water and brought into solution by adding 40% strength sodium hydroxide solution until there is a permanent alkaline reaction. 25 parts of copper sulphate pentahydrate in the form of a 20% strength solution are added dropwise, with stirring, at a temperature of 65° to 70° C., the pH always being kept within a range of 8 to 9 by adding 15% strength sodium hydroxide solution at the same time. The 1:1 copper complex of the monoazo dye forms immediately, the colour changing from red-violet to blue. As soon as the metallisation has ended, the complex dye is precipitated by adding sodium chloride, isolated by filtration, washed with dilute sodium chloride solution and dried in vacuo at 90° C.

After grinding, the novel dye is in the form of a dark powder, which readily dissolves in water to give a violet colour shade, and dyes polyamide fibres or wool from a weakly acid bath in bright, reddish-tinged violet shades with good fastness properties.

If the metallisation of the monoazo dye is carried out under the same conditions using 28 parts of crystalline nickel sulphate in place of copper sulphate, the corresponding 1:1 nickel complex forms and this dyes polyamide fibres in strongly reddish-tinged violet shades.

In the table which follows, further diazo components are given in column I, the coupling components are given in column II, the metals used for forming the complex are given in column III and the colour shades which can be achieved with the particular metal complexes on polyamide fibres or wool are given in column IV.

| No. | I | II | III | IV |
|---|---|---|---|---|
| 1. | [structure: NH—SO2 linked to phenyl with COOH; benzene with OH, NH2, Cl] | [pyridine with OH, NH2] | Cu | green-blue |
| 2. | " | " | Ni | blue |
| 3. | " | " | Co | blue-green |
| 4. | " | [pyridine with Br, OH, OH] | Cu | green-blue |
| 5. | " | " | Ni | blue |
| 6. | [NHSO2-phenyl-COOH; benzene with OH, NH2, NO2] | [pyridine with OH, NH2] | Cu | blue |
| 7. | " | " | Ni | reddish-blue |
| 8. | " | " | Co | grey-blue |
| 9. | [NHSO2-phenyl-COOH; benzene with OH, NH2, CH3] | [pyridine with OH, NH2] | Cu | blue |
| 10. | " | " | Ni | grey-blue |

-continued
| No. | I | II | III | IV |
|---|---|---|---|---|
| 11. | " | " | Co | blue-grey |
| 12. | " | 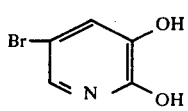 | Cu | blue |
| 13. | " | " | Co | grey |
| 14. | 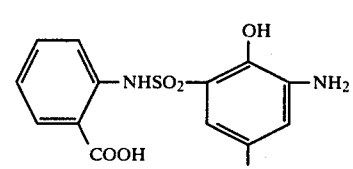 | 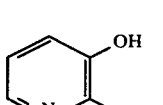 | Cu | green-blue |
| 15. | " | " | Ni | blue |
| 16. | " | " | Co | blue-green |
| 17. | 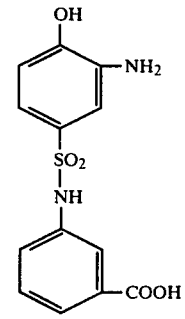 | 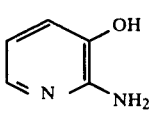 | Cu | blue |
| 18. | " | " | Ni | blue |
| 19. | 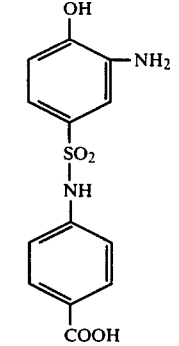 | " | Cu | blue |
| 20. | " | " | Ni | blue |
| 21. | " | " | Co | green-blue |
| 22. | " | 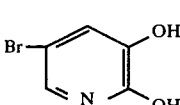 | Cu | blue |
| 23. | 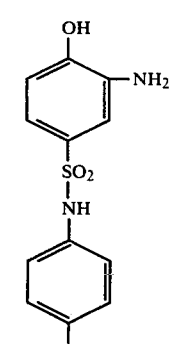 | 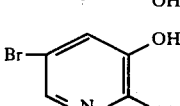 | Ni | red-blue |
| 24. | " | " | Co | green-blue |

-continued

| No. | I | II | III | IV |
|-----|---|----|-----|----|

25. [2-amino-4-hydroxyphenyl-SO2-NH-(2-carboxy-5-methoxyphenyl)] / [2-amino-3-hydroxypyridine] / Cu / blue 26. " / " / Ni / red-blue
27. " / " / Co / green-blue
28. [2-amino-4-hydroxyphenyl-SO2-NH-(2-carboxy-4-chlorophenyl)] / [2-amino-3-hydroxypyridine] / Cu / blue 29. " / " / Ni / blue
30. " / " / Cu / green-blue

[2-amino-4-hydroxy-3-nitrophenyl-SO2-NH-(2-carboxy-4-chlorophenyl)]

31. " / " / Ni / blue
32. " / " / Co / green-blue
33. " / [5-bromo-2,3-dihydroxypyridine] / Cu / green-blue

[2-amino-4-hydroxy-3-nitrophenyl-SO2-NH-(2-carboxy-4-chlorophenyl)]

34. " / " / Ni / blue
35. [4-methoxy-2-(NHSO2-(4-amino-5-hydroxy-2-chloro-phenyl))-benzoic acid] / [2-amino-3-hydroxypyridine] / Cu / blue 36. " / " / Ni / grey-blue

| No. | I | II | III | IV |
|---|---|---|---|---|
| 37. | " | " | Co | green-blue |
| 38. | [structure: benzene with COOH, NH₂, and NHSO₂ linked to benzene with COOH and NHCOCH₃] | " | Cu | violet |
| 39. | [structure: benzene with COOH, NH₂, and NHSO₂ linked to benzene with COOH and NHCOCH₃] | [structure: pyridine with OH and NH₂] | Ni | red-violet |
| 40. | [structure: benzene with COOH, NH₂, and NHSO₂ linked to benzene with COOH and Cl] | " | Cu | violet |
| 41. | " | " | Ni | red-violet |
| 42. | [structure: benzene with COOH, NH₂, and NHSO₂ linked to benzene with COOH and CH₃O] | " | Cu | violet |
| 43. | " | " | Ni | red-violet |
| 44. | [structure: benzene with COOH, NH₂, and N(CH₃)SO₂ linked to benzene with COOH] | [structure: pyridine with OH and NH₂] | Cu | violet |
| 45. | " | " | Ni | red-violet |
| 46. | [structure: benzene with COOH, NH₂, and NHO₂S linked to benzene with COOH] | [structure: pyridine with Br, OH and NH₂] | Cu | red-violet |
| 47. | " | " | Ni | grey-blue |

-continued

| No. | I | II | III | IV |
|---|---|---|---|---|
| 48. | " | Br—[pyridine-OH,OH] | Cu | violet |
| 49. | " | " | Ni | blue |
| 50. | HO—C6H3(CH3CONH)(NH2)—SO2NH—C6H4—COOH | [pyridine-OH,NH2] | Cu | blue |
| 51. | " | " | Ni | violet |
| 52. | HO—C6H2(O2N)(NH2)—SO2NH—C6H4—COOH | [pyridine-OH,NH2] | Ni | blue |
| 53. | " | " | Co | green-blue |
| 54. | HO—C6H3(NH2)—SO2NH—naphthyl-COOH | " | Cu | blue |
| 55. | " | " | Ni | violet |

EXAMPLE 14

55.4 parts of the monoazo dye obtainable according to Example 11 are stirred with 1,000 parts of water at 80° to 85° C. After neutralising the suspension, which initially has an acid reaction, with 15% strength sodium hydroxide solution, 11 parts of n-butylamine are added dropwise. The red-violet reaction mixture is then stirred while boiling under reflux until no further unchanged starting dye can be detected, the colour shade of the solution changing to orange-brown.

In order to separate out the novel monoazo dye of the probable constitution

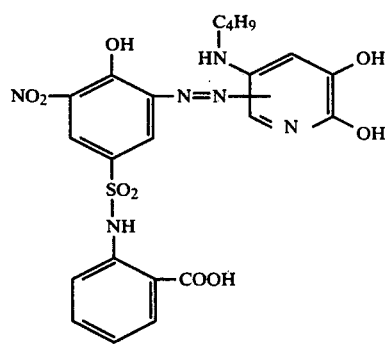

the reaction mixture is treated with sodium chloride and the dye which has precipitated is isolated by filtration and washed with dilute sodium chloride solution.

If 54.6 parts of the resulting monoazo dye are metallised in accordance with the instructions of Example 11 with 25 parts of copper sulphate pentahydrate, the corresponding 1:1 copper complex forms and this dyes polyamide fibres from a weakly acid bath in fast, blue-grey shades.

If the metallisation is carried out with 28 parts of nickel sulphate heptahydrate instead of with copper sulphate, the 1:1 nickel complex forms and polyamide fibres can be dyed in fast, green-blue shades using this complex.

EXAMPLE 15

55.4 parts of the monoazo dye accessible according to Example 11 are mixed to a paste in 1,000 parts of water at 50° C. After adding 24 parts of sodium bicarbonate and 20 parts of sodium p-toluenesulphinate, the reaction mixture is warmed to 90° to 95° C. and stirred under reflux at this temperature until no further starting dye can be detected. During this period, the colour shade changes from red-violet to violet-blue. The novel dye of the probable constitution

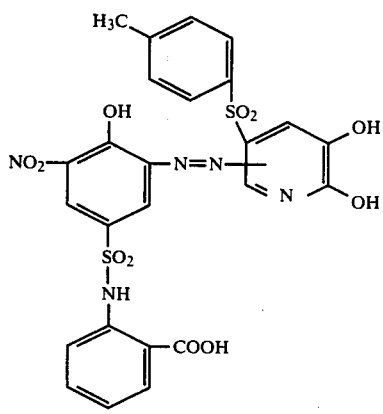

crystallises out in the course of the reaction and is separated out completely by adding sodium chloride, isolated by filtration and washed with dilute sodium chloride solution.

If the resulting dye paste is metallised in accordance with the instructions of Example 11 with 25 parts of copper sulphate pentahydrate or 28 parts of nickel sulphate heptahydrate, the corresponding 1:1 copper complex or, respectively, nickel complex forms and this dyes polyamide fibres or wool from a weakly acid bath in fast greenish-tinged or, respectively, reddish-tinged blue shades.

EXAMPLE 16

62.9 parts of the monoazo dye obtainable according to Example 15 are metallised in accordance with the instructions of Example 12 with 14 parts of crystalline cobalt-II sulphate. The 1:2 cobalt complex which is thus obtained dyes polyamide fibres from a weakly acid bath in full, bluish-tinged green shades with very good fastness properties.

EXAMPLE 17

A solution of 30.8 parts of 1-hydroxy-2-aminobenzene-4-sulphonic acid N-2'-carboxyphenylamide in 200 parts of water and 20 parts of 40% strength sodium hydroxide solution is mixed with 25 parts of 4 N sodium nitrite solution and this mixture is added dropwise, with stirring, to a mixture of 45 parts of 30% strength hydrochloric acid and 150 parts of ice-water.

The yellow suspension of the diazonium compound, which is thus obtained, is approximately neutralised with 15% strength sodium hydroxide solution and treated with a solution of 14.6 parts of 2,3-dihydroxy-5-chloropyridine in 100 parts of water. The suspension is rendered alkaline by introducing 15 parts of calcium hydroxide and the coupling reaction to give the violet monoazo dye of the following probable constitution starts immediately:

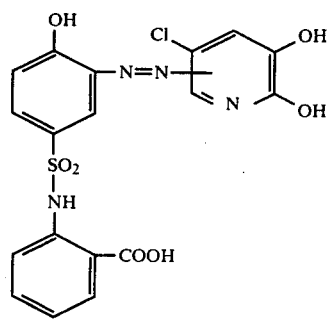

After the coupling reaction has ended, the dye formed is precipitated by acidifying the mixture with 50 parts of 30% strength hydrochloric acid and is isolated by filtration and washed with 5% strength hydrochloric acid.

The amount of filter paste which corresponds to 46.45 parts of the monoazo dye of the above constitution is stirred with 500 parts of hot water and brought into solution by adding 40% strength sodium hydroxide solution until there is a permanent alkaline reaction. 25 parts of copper sulphate pentahydrate in the form of a 20% strength solution are added dropwise, with stirring, at a temperature of 65° to 70° C., the pH always being maintained within a range of 8 to 9 by adding 15% strength sodium hydroxide solution at the same time. The 1:1 copper complex of the monoazo dye forms immediately, the colour changing from red-violet to blue. As soon as the metallisation has ended, the complex dye is precipitated by adding sodium chloride, isolated by filtration, washed with dilute sodium chloride solution and dried in vacuo at 90° C.

After grinding, the novel dye is in the form of a dark powder, which readily dissolves in water to give a blue colour shade, and dyes polyamide fibres or wool from a weakly acid bath in bright, reddish-tinged blue shades with very good fastness properties.

EXAMPLE 18

46.45 parts of the monoazo dye prepared according to Example 17 are stirred with 1,000 parts of water at 50° C. and 30 parts of 20% strength sodium carbonate solution. The red-violet solution is treated with 8.5 parts of 2-mercaptoethanol and then further stirred at 70° to 75° C. until the starting dye has been consumed. The novel dye of the probable constitution

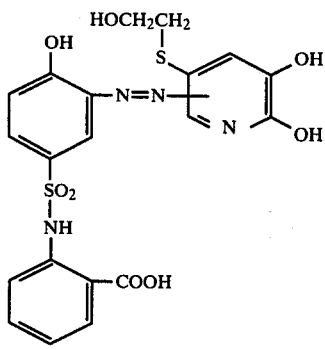

is precipitated from the red-brown reaction solution by adding sodium chloride and is isolated by filtration and washed with dilute sodium chloride solution.

The 1:1 copper complex of the novel dye, which is obtained according to Example 17, gives fast, greenish-tinged blue dyeings on polyamide fibres or wool from a weakly acid bath and the analogous 1:1 nickel complex gives even more greenish-tinged blue shades.

EXAMPLE 19

A solution of 35.8 parts of 1-hydroxy-2-aminobenzene-4-sulphonic acid N-3'-carboxynaphthyl-2'-amide in 200 parts of water and 20 parts of 40% strength sodium hydroxide solution is mixed with 25 parts of 4 N sodium nitrite solution and this mixture is added dropwise, with stirring, to a mixture of 45 parts of 30% strength hydrochloric acid and 150 parts of ice-water. The yellow suspension of the diazonium compound, which is thus obtained, is approximately neutralised with 15% strength sodium hydroxide solution and treated with a solution of 11.2 parts of 2-amino-3-hydroxypyridine in 100 parts of water. The suspension is rendered alkaline by introducing 15 parts of calcium hydroxide and the coupling reaction to give the dye of the following probable constitution starts instantaneously:

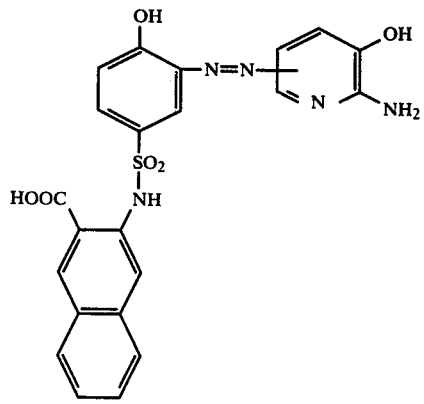

After the coupling reaction has ended, the dye formed is precipitated by acidifying the mixture with 50 parts of 30% strength hydrochloric acid and is isolated by filtration and washed with 50% strength hydrochloric acid.

The amount of filter paste which corresponds to 47.9 parts of the monoazo dye of the above constitution is stirred with 500 parts of hot water and brought into solution by adding 40% strength sodium hydroxide solution. 25 parts of copper sulphate pentahydrate in the form of a 20% strength solution are added dropwise, with stirring, at a temperature of 65° to 70° C., the pH always being kept within a range of 8 to 9 by adding 15% strength sodium hydroxide solution at the same time. The 1:1 copper complex of the monoazo dye forms immediately, the colour changing from red-violet to blue. As soon as the metallisation has ended, the complex dye is precipitated by adding sodium chloride, isolated by filtration, washed with dilute sodium chloride solution and dried in vacuo at 90° C.

After grinding, the novel dye is in the form of a dark powder, which readily dissolves in water to give a blue colour shade, and dyes polyamide fibres or wool from a weakly acid bath in fast blue shades.

If the metallisation of the monoazo dye is carried out under the same conditions using 28 parts of crystalline nickel sulphate in place of copper sulphate, the corresponding 1:1 nickel complex forms and this dyes polyamide fibres in fast, reddish-tinged blue shades.

EXAMPLE 20

47.9 parts of the monoazo dye obtained according to Example 19 are mixed to a paste with 300 parts of hot water and brought into solution by adding 40% strength sodium hydroxide solution until there is a permanent alkaline reaction. While maintaining a temperature of 80° to 85° C., 14.1 parts of crystalline cobalt-II sulphate in the form of a 25% strength solution are added, an alkaline reaction always being maintained by the dropwise addition of 15% strength sodium hydroxide solution. The 1:2 cobalt complex forms immediately, the colour changing from red-violet to green-blue, and after complete metallisation this is separated out by introducing sodium chloride and neutralising the mixture with 15% strength hydrochloric acid. After filtering, washing with sodium chloride solution, drying and grinding, the novel complex dye is in the form of a dark powder which is readily soluble in water; it dyes polyamide fibres and wool in greenish-tinged blue shades with very good fastness to light.

EXAMPLE 21

47.4 parts of the monoazo dye accessible according to Example 5 from diazotised 6-nitro-1-hydroxy-2-aminobenzene-4-sulphonic acid N-2'-carboxyphenylamide and 2-amino-3-hydroxypyridine are stirred with 400 parts of ethylene glycol monomethyl ether. 32 parts of bromine in the form of a 2 molar solution in the same solvent as above are added slowly dropwise, at room temperature, to the resulting suspension. The suspension transiently changes to a clear solution, the colour changing from blue-violet to red, and after a short time virtually all the novel brominated dye crystallises out from this solution. As soon as no further starting dye can be detected by chromatography, the novel dye is isolated by filtration and washed, first with the same solvent and then with dilute sodium chloride solution.

The filter paste of the brominated dye is mixed with 600 parts of water at 70° C. and 20 parts by volume of a 30% strength sodium hydroxide solution. A solution of 27.5 parts of crystalline copper sulphate, 15.0 parts of tartaric acid and 20 parts of sodium hydroxide in 300 parts of water is added to the resulting violet-blue solution at the same temperature. The 1:1 copper complex of the dye forms instantaneously, the colour changing to green-blue; the dye is separated out by adding sodium chloride, isolated by filtration washed with dilute sodium chloride solution and dried. The dye, which after grinding is obtained in the form of a dark blue powder dyes polyamide fibres from a weakly acid bath in intense, bright green-blue shades with good fastness properties, especially outstanding fastness to light.

EXAMPLE 22

If the corresponding 1:1 copper complex is used in place of the starting dye mentioned in Example 21 and in other respects the same procedure is maintained, a brominated complex dye, which is a single compound and has a distinctly more greenish-tinged colour shade than the starting material, is formed; according to chromatography, and coloristically, this dye is identical to the 1:1 copper complex, obtained by subsequent metallisation, of the preceding example.

EXAMPLE 23

42.9 parts of the monoazo dye obtained from diazotised 1-hydroxy-2-aminobenzene-4-sulphonic acid N-2'-carboxyphenylamide and 2-amino-3-hydroxypyridine and mentioned in Example 1 are stirred with 300 parts of dimethylformamide. A solution of 48 parts of bromine in 200 parts of dimethylformamide is added slowly dropwise at room temperature. A novel dye, which is a single compound and differs from the starting dye in that the $R_f$ value on chromatography is markedly greater and there is a bathochromic shift in the shade, forms, the temperature rising to about 30° C. and the colour changing from blue-violet to dark red. As soon as the bromination has ended, the reaction solution is added dropwise to 1,000 parts of ice-water, with stirring. The dye, which precipitates completely, is isolated by filtration and washed with ice-water.

The filter paste of the brominated dye is treated with 800 parts of water and 20 parts by volume of a 30% strength sodium hydroxide solution. After warming to 80° C., a solution of 14 parts of crystalline cobalt sulphate, 15 parts of tartaric acid and 20 parts of sodium hydroxide in 400 parts of water at 70° C. is poured in. The 1:2 cobalt complex of the brominated dye forms, the colour changing to dark green. After the metallisation has ended, the complex dye is separated out completely by adding sodium chloride, isolated by filtration, washed with dilute sodium chloride solution, dried and ground. On polyamide fibres and wool, the novel dye, when applied from a weakly acid dyebath, gives blue-grey shades which are fast to light and wet processing.

If, for bromination, the corresponding 1:2 cobalt complex is used in place of the metal-free monoazo dye, a bromine-containing complex dye which is identical to the dye described above is formed when the same procedure is used.

EXAMPLE 24

40.7 parts of the 1:1 chromium complex of the azo dye obtained from diazotised 5-nitro-2-amino-1-hydroxybenzene and 1-hydroxynaphthalene-4-sulphonic acid, which complex is obtainable by a known process and contains 1 atom of chromium per molecule of monoazo dye, are stirred together with 47.4 parts of the monoazo dye which is obtained from diazotised 6-nitro-1-hydroxy-2-aminobenzene-4-sulphonic acid N-2'-carboxyphenylamide and 2-amino-3-hydroxypyridine and is accessible according to Example 5, in 500 parts of water. The pH of the suspension is adjusted to 7 to 8 by adding 20 parts by volume of concentrated sodium hydroxide solution and the mixture is then stirred at 90° to 95° C. until the two starting dyes can no longer be detected. The chromium mixed complex, which is a single compound and is present in a clear solution, is precipitated by adding sodium chloride, isolated by filtration, and after washing with sodium chloride solution, dried in vacuo. After grinding, the dye is in the form of a dark blue powder, which is readily soluble in water, and dyes wool or polyamide fibres from a dyebath containing ammonium sulphate in full grey-blue shades with good fastness properties.

EXAMPLE 25

35.8 parts of the 1:1 chromium complex of the azo dye obtained from diazotised 5-nitro-2-amino-1-hydroxybenzene and 2-aminonaphthalene, which complex is obtainable by a known process and contains 1 atom of chromium per molecule of monoazo dye, are stirred, together with 47.4 parts of the monoazo dye which is obtained from diazotised 6-nitro-1-hydroxy-2-aminobenzene-4-sulphonic acid N-2'-carboxyphenylamide and 2-amino-3-hydroxypyridine and is accessible according to Example 5, in a mixture of 500 parts of water and 500 parts of isopropyl alcohol. The pH of the suspension is adjusted to 7 to 8 by adding 20 parts by volume of concentrated sodium hydroxide solution and the mixture is then stirred at 90° to 95° C. until the two starting dyes can no longer be detected. The chromium mixed complex, which is a single compound and present in a clear solution, is precipitated, after distilling off the isopropyl alcohol, by adding sodium chloride, isolated by filtration and, after washing with sodium chloride solution, dried in vacuo. After grinding, the dye is in the form of a dark blue powder, which is readily soluble in water, and dyes wool or polyamide fibres from a dyebath containing ammonium sulphate in full bluish-tinged dark grey shades with good fastness properties.

EXAMPLE 26

47.4 parts of the dye which is obtained from diazotised 6-nitro-2-aminophenol-4-sulphonic acid N-2'-carboxyphenylamide and 2-amino-3-hydroxypyridine, and is obtainable according to the instructions in Example 5, and 40.1 parts of the dye which is obtained from diazotised 5-nitro-2-amino-1-hydroxybenzene and 2-aminonaphthalene-6-sulphonic acid N-methylamide, and is accessible in a known manner, are stirred together with 200 parts of formamide at 70° C. After introducing 26 parts of cobalt-II acetate tetrahydrate, the metallisation mixture is further stirred at 70° to 80° C. until no further metal-free dye can be detected. The dye which is precipitated on dilution of the reaction mixture with 1,000 parts of sodium chloride solution is filtered off, washed with dilute sodium chloride solution and dried. The dye obtained after grinding dyes polyamide fibres from a weakly acid bath in fast, level grey-blue shades.

EXAMPLE 27

42.9 parts of the dye which is obtained from diazotised 1-amino-2-hydroxybenzene-4-sulphonic acid N-2'-carboxyphenylamide and 2-amino-3-hydroxypyridine, and is obtainable according to the instructions in Example 3, and 40.1 parts of the dye which is obtained from diazotised 5-nitro-2-amino-1-hydroxybenzene and 2-aminonaphthalene-6-sulphonic acid N-methylamide, and is accessible in a known manner, are stirred together with 200 parts of formamide at 70° C. After introducing 26 parts of cobalt-II acetate tetrahydrate, the metallisation mixture is further stirred at 70° C. until no further metal-free dye can be detected. The dye which is precipitated on diluting the reaction mixture with 1,000 parts of sodium chloride solution is filtered off, washed with dilute sodium chloride solution and dried. The dye obtained after grinding dyes polyamide fibres from a weakly acid bath in fast, level grey shades.

EXAMPLE 28

47.4 parts of the dye which is obtained from diazotised 6-nitro-6-aminophenol-4-sulphonic acid N-2'-carboxyphenylamide and 2-amino-3-hydroxypyridine, and is obtainable according to Example 5, and 42.45 parts of the dye which is obtained from diazotised 2-amino-1-hydroxybenzene-4-sulphonic acid N-methylamide and 2'-chloroacetoacetic acid anilide, and is obtainable in a known manner, are stirred together with 800 parts of water at 50° C. and 10 parts of sodium hydroxide. After adding a solution of 30 parts of crystalline cobalt-II sulphate in 150 parts of water, the metallisation mixture is stirred at 50° to 60° C. until no further metal-free starting dyes can be detected. The dye precipitated on the addition of sodium chloride is filtered off, washed with dilute sodium chloride solution, dried in vacuo and ground. On wool or polyamide fibres, level green dyeings with good fastness properties are achieved with the novel dye, applied from a weakly acid bath.

EXAMPLE 29

42.9 parts of the dye which is obtained from diazotised 2-amino-1-hydroxybenzene-4-sulphonic acid N-2'-carboxyphenylamide and 2-amino-3-hydroxypyridine, and is obtainable according to Example 1, and 42.45 parts of the dye which is obtained from diazotised 2-amino-1-hydroxybenzene-4-sulphonic acid N-methylamide and 2'-chloroacetoacetic acid anilide, and is obtainable in a known manner, are stirred together with 800 parts of water at 50° C. and 10 parts of sodium hydroxide. After adding a solution of 30 parts of crystalline cobalt-II sulphate in 150 parts of water, the metallisation mixture is stirred at 50° to 60° C. until no further metal-free starting dyes can be detected. The dye precipitated on the addition of sodium chloride is filtered off, washed with dilute sodium chloride solution, dried in vacuo and ground. On wool or polyamide fibres, full olive shades with good fastness properties are achieved with the novel dye, applied from a weakly acid bath.

EXAMPLE 30

55.4 parts of the monoazo dye accessible according to Example 11 are mixed to a paste in 1,000 parts of water at 50° C. After adding 20 parts of 30% strength sodium hydroxide solution and 11 parts of thiophenol, the reaction mixture is warmed to 90° to 95° C. and stirred under reflux at this temperature until no further starting dye can be detected. During this time the colour shade changes from red-violet to violet-blue. The novel dye of the probable constitution

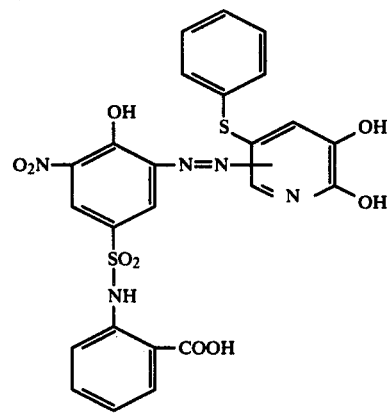

crystallises out in the course of the reaction and is separated out completely by adding sodium chloride, isolated by filtration and washed with dilute sodium chloride solution.

If the resulting dye paste is metallised in accordance with the instructions of Example 11 using 25 parts of copper sulphate pentahydrate or 28 parts of nickel sulphate heptahydrate, the corresponding 1:1 copper complex or, respectively, 1:1 nickel complex forms and this dyes polyamide fibres or wool from a weakly acid bath in fast greenish-tinged or, respectively, reddish-tinged blue shades.

EXAMPLE 31

55.4 parts of the monoazo dye accessible according to Example 11 are mixed to a paste in 1,000 parts of water at 50° C. After adding 12 parts of anhydrous sodium carbonate and 15.4 parts of thiosalicylic acid, the reaction mixture is warmed to 90° to 95° C. and stirred under reflux at this temperature until no further starting dye can be detected. During this period, the colour shade changes from red-violet to violet-blue. The novel dye of the probable constitution

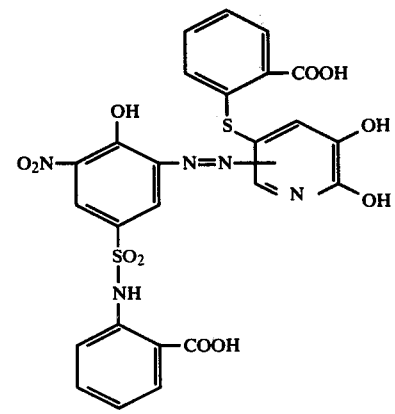

partially crystallises out and is completely separated out by adding sodium chloride, by filtration and washed with dilute sodium chloride solution.

If the resulting dye paste is metallised in accordance with the instructions of Example 11 using 25 parts of copper sulphate pentahydrate or 28 parts of nickel sulphate heptahydrate, the corresponding 1:1 copper complex or, respectively, 1:1 nickel complex forms and this dyes polyamide fibres or wool from a weakly acid bath in fast, greenish-tinged or, respectively, reddish-tinged blue shades.

EXAMPLE 32

A solution of 34.25 parts of 1-hydroxy-2-amino-4-chlorobenzene-5-sulphonic acid N-2'-carboxyphenylamide in 200 parts of water and 20 parts of 40% strength sodium hydroxide solution is mixed with 25 parts of 4 N sodium nitrite solution and this mixture is added dropwise, with stirring, to a mixture of 45 parts of 30% strength hydrochloric acid and 150 parts of ice-water.

The yellow suspension of the diazonium compound, which is thus obtained, is approximately neutralised with 15% strength sodium hydroxide solution and treated with a solution of 19.2 parts of 2,3-dihydroxy-5-bromopyridine in 100 parts of water. The suspension is rendered alkaline by introducing 15 parts of calcium hydroxide and the coupling reaction to give the violet monoazo dye of the following probable constitution starts immediately:

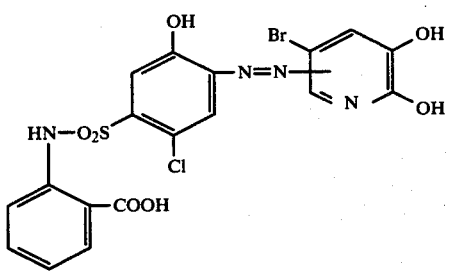

After the coupling reaction has ended, the dye formed is precipitated by acidifying the mixture with 50 parts of 30% strength hydrochloric acid and is isolated by filtration and washed with 5% strength hydrochloric acid.

The amount of filter paste which corresponds to 54.85 parts of the monazo dye of the above constitution is stirred with 500 parts of hot water and brought into solution by adding 40% strength sodium hydroxide solution until there is a permanent alkaline reaction.

25 parts of copper sulphate pentahydrate in the form of a 20% strength solution are added dropwise, with stirring, at a temperature of 65° to 70° C., the pH always being kept within a range of 8 to 9 by adding 15% strength sodium hydroxide solution at the same time. The 1:1 copper complex of the monoazo dye forms immediately, the colour changing from red-violet to blue. As soon as the metallisation has ended, the complex dye is precipitated by adding sodium chloride, isolated by filtration, washed with dilute sodium chloride solution and dried in vacuo at 90° C. After grinding, the novel dye is in the form of a dark powder, which readily dissolves in water to give a blue colour shade, and dyes polyamide fibres or wool from a weakly acid bath in blue shades with very good fastness properties.

If the metallisation of the monoazo dye is carried out under the same conditions using 28 parts of crystalline nickel sulphate in place of copper sulphate, the corresponding 1:1 nickel complex forms and this dyes polyamide fibres in fast, reddish-tinged blue shades.

EXAMPLE 33

54.85 parts of the monoazo dye accessible according to Example 32 are mixed to a paste in 1,000 parts of water at 50° C. After adding 24 parts of sodium bicarbonate and 20 parts of sodium p-toluenesulphinate, the reaction mixture is warmed to 90° to 95° C. and stirred under reflux at this temperature until no further starting dye can be detected. During this period, the colour shade changes from red-violet to violet-blue. The novel dye of the probable constitutition

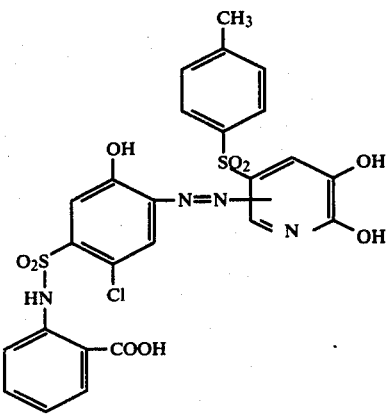

crystallises out in the course of the reaction and is completely separated out by adding sodium chloride, isolated by filtration and washed with dilute sodium chloride solution.

If the resulting dye paste is metallised in accordance with the instructions of Example 11 using 25 parts of copper sulphate pentahydrate or 28 parts of nickel sulphate heptahydrate, the corresponding 1:1 copper complex or, respectively, 1:1 nickel complex forms and this dyes polyamide fibres or wool from a weakly acid bath in fast blue shades.

EXAMPLE 34

54.85 parts of the monoazo dye accessible according to Example 32 are mixed to a paste in 1,000 parts of water at 50° C. After adding 20 parts of 30% strength sodium hydroxide solution and 11 parts of thiophenol, the reaction mixture is warmed to 90° to 95° C. and stirred under reflux at this temperature until no further starting dye can be detected. During this period, the colour shade changes from red-violet to violet-blue. The novel dye of the probable constitution

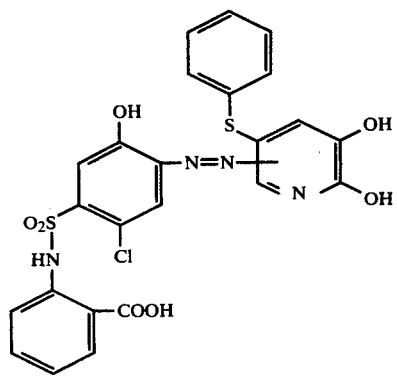

crystallises out in the course of the reaction and is completely separated out by adding sodium chloride, isolated by filtration and washed with dilute sodium chloride solution.

If the resulting dye paste is metallised in accordance with the instructions of Example 11 using 25 parts of copper sulphate pentahydrate, the corresponding 1:1 copper complex forms and this dyes polyamide fibres or wool from a weakly acid bath in fast, greenish-tinged blue shades.

EXAMPLE 35

A solution of 35.3 parts of 6-nitro-2-hydroxy-2-aminobenzene-4-sulphonic acid N-2'-carboxyphenylamide in 200 parts of water and 20 parts of 40% strength sodium hydroxide solution is mixed with 25 parts of 4 N sodium nitrite solution and this mixture is added dropwise, with stirring, to a mixture of 45 parts of 30% strength hydrochloric acid and 150 parts of ice-water.

The yellow suspension of the diazonium compound, which is thus obtained, is approximately neutralised with 15% strength sodium hydroxide solution and treated with a solution of 18.9 parts of 2-amino-3-hydroxy-5-bromopyridine in 100 parts of water. The suspension is rendered alkaline by introducing 15 parts of calcium hydroxide and the coupling reaction to give the violet monoazo dye of the following probable constitution starts immediately:

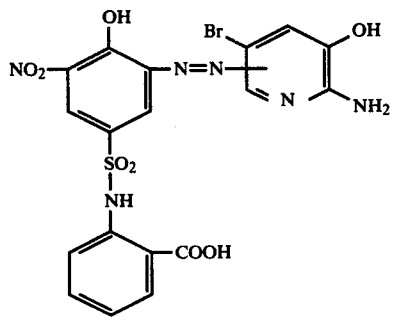

After the coupling reaction has ended, the dye formed is precipitated by acidifying the mixture with 50 parts of 30% strength hydrochloric acid and is isolated by filtration and washed with 5% strength hydrochloric acid.

The amount of filter paste which corresponds to 55.6 parts of the monoazo dye of the above constitution is stirred with 500 parts of hot water and brought into solution by adding 40% strength sodium hydroxide solution until there is a permanent alkaline reaction.

25 parts of copper sulphate pentahydrate in the form of a 20% strength solution are added dropwise, with stirring, at a temperature of 65° to 70° C., the pH always being kept within a range of 8 to 9 by adding 15% strength sodium hydroxide solution at the same time. The 1:1 copper complex of the monoazo dye forms immediately, the colour changing from red-violet to blue. As soon as the metallisation had ended, the complex dye is precipitated by adding sodium chloride, isolated by filtration, washed with dilute sodium chloride solution and dried in vacuo at 90° C. After grinding, the novel dye is in the form of a dark powder, which readily dissolves in water to give a blue colour shade, and dyes polyamide fibres or wool from a weakly acid bath in sky blue shades with very good fastness properties.

If the metallisation of the monoazo dye is carried out under the same conditions using 28 parts of crystalline nickel sulphate in place of copper sulphate, the corresponding 1:1 nickel complex forms and this dyes polyamide fibres in fast, reddish-tinged blue shades.

EXAMPLE 36

55.6 parts of the monoazo dye accessible according to Example 35 are mixed to a paste in 1,000 parts of water at 50° C. After adding 24 parts of sodium bicarbonate and 20 parts of sodium p-toluenesulphinate, the reaction mixture is warmed to 90° to 95° C. and stirred under reflux at this temperature until no further starting dye can be detected. During this period, the colour shade changes from red-violet to violet-blue. The novel dye of the probable constitution

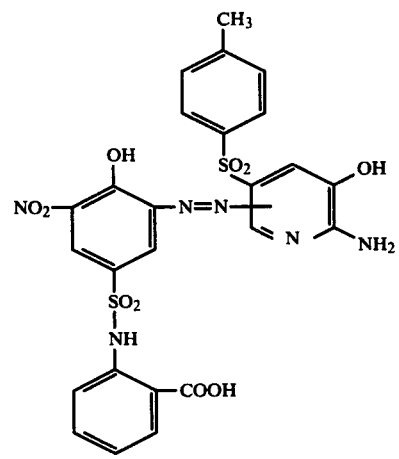

crystallises out in the course of the reaction and is completely separated out by adding sodium chloride, isolated by filtration and washed with dilute sodium chloride solution.

If the resulting dye paste is metallised in accordance with the instructions of Example 11 using 25 parts of copper sulphate pentahydrate, the corresponding 1:1 copper complex forms and this dyes polyamide fibres or wool from a weakly acid bath in fast green-blue shades.

EXAMPLE 37

55.6 parts of the monoazo dye accessible according to Example 35 are mixed to a paste with 1,000 parts of water at 50° C. After adding 12 parts of anhydrous sodium carbonate and 15.4 parts of thiosalicylic acid, the reaction mixture is warmed to 90° to 95° C. and stirred under reflux at this temperature until no further starting dye can be detected. During this period, the colour shade changes from violet to blue. The novel dye of the probable constitution

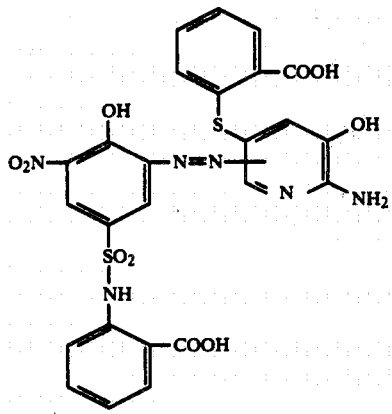

crystallises out in the course of the reaction and is completely separated out by adding sodium chloride, isolated by filtration and washed with dilute sodium chloride solution.

If the resulting dye paste is metallised in accordance with the instructions of Example 11 using 25 parts of copper sulphate pentahydrate, the corresponding 1:1 copper complex forms and this dyes polyamide fibres or wool from a weakly acid bath in fast, strongly greenish-tinged blue shades.

EXAMPLE 38

55.6 parts of the monoazo dye accessible according to Example 35 are mixed to a paste in 1,000 parts of water at 50° C. After adding 20 parts of 30% strength sodium hydroxide solution and 11 parts of thiophenol, the reaction mixture is warmed to 90° to 95° C. and stirred under reflux at this temperature until no further starting dye can be detected. During this period, the colour shade changes from violet to blue. The novel dye of the probable constitution

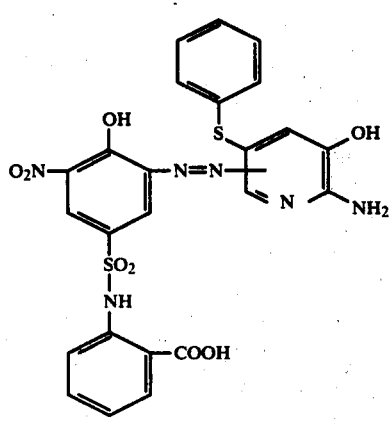

crystallises out in the course of the reaction and is completely separated out by adding sodium chloride, isolated by filtration and washed with dilute sodium chloride solution.

If the resulting dye paste is metallised in accordance with the instructions of Example 11 using 25 parts of copper sulphate pentahydrate, the corresponding 1:1 copper complex forms and this dyes polyamide fibres or wool from a weakly acid bath in fast green-blue shades.

EXAMPLE 39

A solution of 34.4 parts of 1-hydroxy-2-aminobenzene-5-sulphonic acid N-2'-sulphophenylamide in 200 parts of water and 20 parts of 40% strength sodium hydroxide solution is mixed with 25 parts of 4 N sodium nitrite solution and this mixture is added dropwise, with stirring, to a mixture of 45 parts of 30% strength hydrochloric acid and 150 parts of ice-water.

The yellow suspension of the diazonium compound, which is thus obtained, is approximately neutralised with 15% strength sodium hydroxide solution and treated with a solution of 11.2 parts of 2-amino-3-hydroxypyridine in 100 parts of water. The suspension is rendered alkaline by introducing 15 parts of calcium hydroxide and the coupling reaction to give the violet monoazo dye of the following probable constitution takes place immediately:

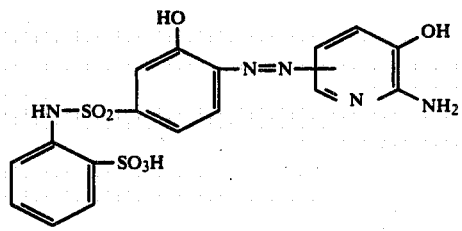

After the coupling reaction has ended, the dye formed is precipitated by acidifying the mixture with 50 parts of 30% strength hydrochloric acid and is isolated by filtration and washed with 5% strength hydrochloric acid.

The amount of filter paste which corresponds to 46.5 parts of the monoazo dye of the above constitution is stirred with 500 parts of hot water and brought into solution by adding 40% strength sodium hydroxide solution until there is a permanent alkaline reaction. 25 parts of copper sulphate pentahydrate in the form of a 20% strength solution are added dropwise, with stirring, at a temperature of 65° to 70° C., the pH always being kept within a range of 8 to 9 by adding 15% strength sodium hydroxide solution at the same time. The 1:1 copper complex of the monoazo dye forms immediately, the colour changing from red-violet to blue. As soon as the metallisation has ended, the complex dye is precipitated by adding sodium chloride, isolated by filtration, washed with dilute sodium chloride solution and dried in vacuo at 90° C.

After grinding, the novel dye is in the form of a dark powder, which readily dissolves in water to give a blue colour shade, and dyes polyamide fibres or wool from a weakly acid bath in bright, greenish-tinged blue shades with very good fastness properties.

If the metallisation of the monoazo dye is carried out under the same conditions using 28 parts of crystalline nickel sulphate in place of copper sulphate, the corresponding 1:1 nickel complex forms and this dyes polyamide fibres in fast blue shades.

In order to prepare the diazotisation component used above, benzoxazolone-6-sulphonyl chloride, which is obtained in a conventional manner, is reacted with orthanilic acid and the resulting amidation product is saponified with 15% strength sodium hydroxide solution while boiling under reflux, to give the free 2-aminophenol.

EXAMPLE 40

A solution of 34.4 parts of 1-hydroxy-2-aminobenzene-4-sulphonic acid N-2'-sulphophenylamide in 200 parts of water and 20 parts of 40% strength sodium hydroxide solution is mixed with 25 parts of 4 N sodium nitrite solution and this mixture is added dropwise, with stirring, to a mixture of 45 parts of 30% strength hydrochloric acid and 150 parts of ice-water.

The yellow suspension of the diazonium compound, which is thus obtained, is approximately neutralised with 15% strength sodium hydroxide solution and treated with a solution of 11.2 parts of 2-amino-3-hydroxypyridine in 100 parts of water. The suspension is rendered alkaline by introducing 15 parts of calcium hydroxide and the coupling reaction to give the violet monoazo dye of the following probable constitution starts immediately:

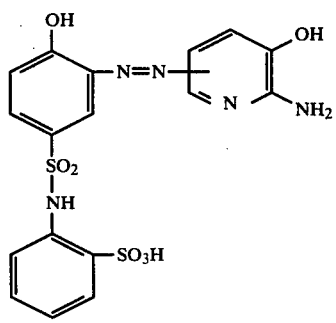

After the coupling reaction has ended, the dye formed is precipitated by acidifying the mixture with 50 parts of 30% strength hydrochloric acid and is isolated by filtration and washed with 5% strength hydrochloric acid.

The amount of filter paste which corresponds to 46.5 parts of the monoazo dye of the above constitution is stirred with 500 parts of hot water and brought into solution by adding 40% strength sodium hydroxide solution until there is a permanent alkaline reaction. 25 parts of copper sulphate pentahydrate in the form of a 20% strength solution are added dropwise, with stirring, at a temperature of 65° to 70° C., the pH always being kept within a range of 8 to 9 by adding 15% strength sodium hydroxide solution at the same time. The 1:1 copper complex of the monoazo dye forms immediately, the colour changing from red-violet to blue. As soon as the metallisation has ended, the complex dye is precipitated by adding sodium chloride, isolated by filtration, washed with dilute sodium chloride solution and dried in vacuo at 90° C. After grinding, the novel dye is in the form of a dark powder, which readily dissolves in water to give a blue colour shade, and dyes polyamide fibres or wool from a weakly acid bath in sky blue shades with very good fastness properties.

If the metallisation of the monoazo dye is carried out under the same conditions using 28 parts of crystalline nickel sulphate in place of copper sulphate, the corresponding 1:1 nickel complex forms and this dyes polyamide fibres in fast, reddish-tinged blue shades.

EXAMPLE 41

46.5 parts of the monoazo dye obtained according to Example 40 are mixed to a paste with 300 parts of hot water and brought into solution by adding 40% strength sodium hydroxide solution until there is a permanent alkaline reaction. While maintaining a temperature of 80° to 85° C., 14.1 parts of crystalline cobalt-II sulphate in the form of a 25% strength solution are added, an alkaline reaction always being maintained by the dropwise addition of 15% strength sodium hydroxide solution. The 1:2 cobalt complex forms immediately, the colour changing from red-violet to green-blue, and after complete metallisation this complex is separated out by introducing sodium chloride and neutralising the mixture with 15% strength hydrochloric acid.

After filtering, washing with sodium chloride, drying and grinding, the novel complex dye is in the form of a dark powder which is readily soluble in water; it dyes polyamide fibres and wool in greenish-tinged blue shades with very good fastness to light.

EXAMPLE 42

A solution of 38.9 parts of 6-nitro-1-hydroxy-2-aminobenzene-4-sulphonic acid N-2'-sulphophenylamide in 200 parts of water and 20 parts of 40% strength sodium hydroxide solution is mixed with 25 parts of 4 N sodium nitrite solution and this mixture is added dropwise, with stirring, to a mixture of 45 parts of 30% strength hydrochloric acid and 150 parts of ice-water.

The yellow suspension of the diazonium compound, which is thus obtained, is approximately neutralised with 15% strength sodium hydroxide solution and treated with a solution of 11.2 parts of 2-amino-3-hydroxypyridine in 100 parts of water. The suspension is rendered alkaline by introducing 15 parts of calcium hydroxide and the coupling reaction to give the violet monoazo dye of the following probable constitution starts immediately:

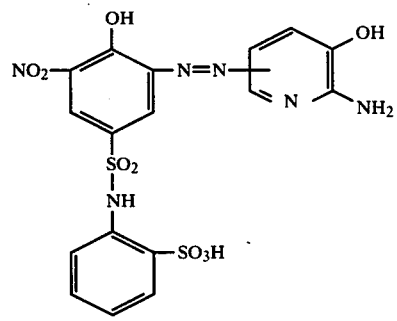

After the coupling reaction has ended, the dye formed is precipitated by acidifying the mixture with 50 parts of 30% strength hydrochloric acid and is isolated by filtration and washed with 5% strength hydrochloric acid.

The amount of filter paste which corresponds to 51.0 parts of the monoazo dye of the above constitution is stirred with 500 parts of hot water and brought into solution by adding 40% strength sodium hydroxide solution until there is a permanent alkaline reaction. 25 parts of copper sulphate pentahydrate in the form of a 20% strength solution are added dropwise, with stirring, at a temperature of 65° to 70° C., the pH always being kept within a range of 8 to 9 by adding 15% strength sodium hydroxide solution at the same time. The 1:1 copper complex of the monoazo dye forms immediately, the colour changing from red-violet to blue. As soon as the metallisation has ended, the complex dye is precipitated by adding sodium chloride, isolated by filtration, washed with dilute sodium chloride solution and dried in vacuo at 90° C.

After grinding, the novel dye is in the form of a dark powder, which readily dissolves in water to give a blue colour shade, and dyes polyamide fibres or wool from a weakly acid bath in bright, neutral blue shades with very good fastness properties.

If the metallisation of the monoazo dye is carried out under the same conditions using 28 parts of crystalline nickel sulphate in place of copper sulphate, the corresponding 1:1 nickel complex forms and this dyes polyamide fibres in fast blue shades.

Under the same conditions, metallisation with only 14 parts of crystalline nickel sulphate gives the 1:2 nickel complex, which dyes polyamide fibres from a weakly acid bath in fast, reddish-tinged blue shades.

EXAMPLE 43

51.0 parts of the monoazo dye obtained according to Example 42 are mixed to a paste with 300 parts of hot water and brought into solution by adding 40% strength sodium hydroxide solution until there is a permanent alkaline reaction. While maintaining a temperature of 80° to 85° C., 14.1 parts of crystalline cobalt-II sulphate in the form of a 25% strength solution are added, an alkaline reaction always being maintained by the dropwise addition of 15% strength sodium hydroxide solution. The 1:2 cobalt complex forms immediately, the colour changing from red-violet to blue-green, and after complete metallisation, this complex is separated out by introducing sodium chloride and neutralising the mixture with 15% strength hydrochloric acid.

After filtering, washing with sodium chloride solution, drying and grinding, the novel complex dye is in the form of a dark powder which is readily soluble in water; it dyes polyamide fibres and wool in blue-green shades with very good fastness to light.

EXAMPLE 44

A solution of 37.85 parts of 4-chloro-1-hydroxy-2-aminobenzene-6-sulphonic acid N-2'-sulphophenylamide in 200 parts of water and 20 parts of 40% strength sodium hydroxide solution is mixed with 25 parts of 4 N sodium nitrite solution and this mixture is added dropwise, with stirring, to a mixture of 45 parts of 30% strength hydrochloric acid and 150 parts of ice-water.

The yellow suspension of the diazonium compound, which is thus obtained, is approximately neutralised with 15% strength sodium hydroxide solution and treated with a solution of 11.2 parts of 2-amino-3-hydroxypyridine in 100 parts of water. The suspension is rendered alkaline by introducing 15 parts of calcium hydroxide and the coupling reaction to give the violet monoazo dye of the following probable constitution starts immediately:

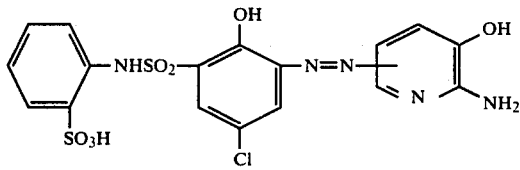

After the coupling reaction has ended, the dye formed is precipitated by acidifying the mixture with 50 parts of 30% strength hydrochloric acid and is isolated by filtration and washed with 5% strength hydrochloric acid.

The amount of filter paste which corresponds to 49.95 parts of the monoazo dye of the above constitution is stirred with 500 parts of hot water and brought into solution by adding 40% strength sodium hydroxide solution until there is a permanent alkaline reaction. 25 parts of copper sulphate pentahydrate in the form of a 20% strength solution are added dropwise, with stirring, at a temperature of 65° to 70° C., the pH always being kept within a range of 8 to 9 by adding 15% strength sodium hydroxide solution at the same time. The 1:1 copper complex of the monoazo dye forms immediately, the colour changing from red-violet to blue. As soon as the metallisation has ended, the complex dye is precipitated by adding sodium chloride, isolated by filtration, washed with dilute sodium chloride solution and dried in vacuo at 90° C.

After grinding, the novel dye is in the form of a dark powder, which readily dissolves in water to give a blue colour shade, and dyes polyamide fibres or wool from a weakly acid bath in sky blue shades with very good fastness properties.

If the metallisation of the monoazo dye is carried out under the same conditions using 28 parts of crystalline nickel sulphate in place of copper sulphate, the corresponding 1:1 nickel complex forms and this dyes polyamide fibres in fast reddish-tinged blue shades.

EXAMPLE 45

A solution of 38.9 parts of 6-nitro-1-hydroxy-2-aminobenzene-4-sulphonic acid N-2'-sulphophenylamide in 200 parts of water and 20 parts of 40% strength sodium hydroxide solution is mixed with 25 parts of 4 N sodium nitrite solution and this mixture is added dropwise, with stirring, to a mixture of 45 parts of 30% strength hydrochloric acid and 150 parts of ice-water.

The yellow suspension of the diazonium compound, which is thus obtained, is approximately neutralised with 15% strength sodium hydroxide solution and treated with a solution of 19.2 parts of 2,3-dihydroxy-5-bromopyridine in 100 parts of water. The suspension is rendered alkaline by introducing 15 parts of calcium hydroxide and the coupling reaction to give the violet monoazo dye of the following probable constitution starts immediately:

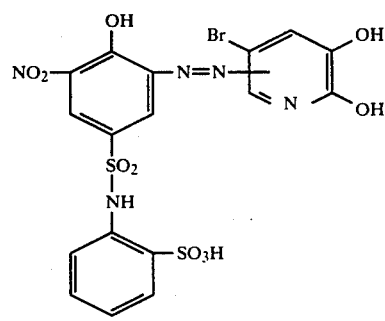

After the coupling reaction has ended, the dye formed is precipitated by acidifying the mixture with 50 parts of 30% strength hydrochloric acid and is isolated by filtration and washed with 5% strength hydrochloric acid.

The amount of filter paste which corresponds to 59.0 parts of the monoazo dye of the above constitution is stirred with 500 parts of hot water and brought into solution by adding 40% strength sodium hydroxide solution until there is a permanent alkaline reaction.

25 parts of copper sulphate pentahydrate in the form of a 20% strength solution are added dropwise, with stirring, at a temperature of 65° to 70° C., the pH always being kept within a range of 8 to 9 by adding 15% strength sodium hydroxide solution at the same time. The 1:1 copper complex of the monoazo dye forms immediately, the colour changing from red-violet to blue. As soon as the metallisation has ended, the complex dye is precipitated by adding sodium chloride, isolated by filtration, washed with dilute sodium chloride solution and dried in vacuo at 90° C. After grinding, the novel dye is in the form of a dark powder, which readily dissolves in water to give a blue colour shade, and dyes polyamide fibres or wool from a weakly acid bath in sky blue shades with very good fastness properties.

If the metallisation of the monoazo dye is carried out under the same conditions using 28 parts of crystalline nickel sulphate in place of copper sulphate, the corresponding 1:1 nickel complex forms and this dyes polyamide fibres in fast, reddish-tinged blue shades.

EXAMPLE 46

A solution of 37.2 parts of 1-carboxy-2-aminobenzene-5-sulphonic acid N-2'-sulphophenylamide in 200 parts of water and 20 parts of 40% strength sodium hydroxide solution is mixed with 25 parts of 4 N sodium nitrite solution and this mixture is added dropwise, with stirring, to a mixture of 45 parts of 30% strength hydrochloric acid and 150 parts of ice-water.

The yellow suspension of the diazonium compound, which is thus obtained, is approximately neutralised with 15% strength sodium hydroxide solution and treated with a solution of 11.2 parts of 2-amino-3-hydroxypyridine in 100 parts of water. The suspension is rendered alkaline by introducing 15 parts of calcium hydroxide and the coupling reaction to give the violet monoazo dye of the following probable constitution takes place immediately:

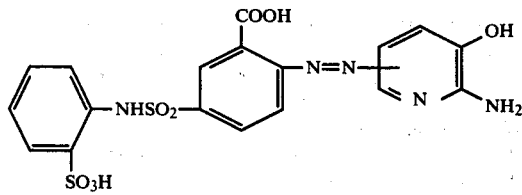

After the coupling reaction has ended, the dye formed is precipitated by acidifying the mixture with 50 parts of 30% strength hydrochloric acid and is isolated by filtration and washed with 5% strength hydrochloric acid.

The amount of filter paste which corresponds to 49.3 parts of the monoazo dye of the above constitution is stirred with 500 parts of hot water and brought into solution by adding 40% strength sodium hydroxide solution until there is a permanent alkaline reaction. 25 parts of copper sulphate pentahydrate in the form of a 20% strength solution are added dropwise, with stirring, at a temperature of 65° to 70° C., the pH always being kept within a range of 8 to 9 by adding 15% strength sodium hydroxide solution at the same time. The 1:1 copper complex of the monoazo dye forms immediately, the colour changing from red-violet to blue. As soon as the metallisation has ended, the complex dye is precipitated by adding sodium chloride, isolated by filtration, washed with dilute sodium chloride solution and dried in vacuo at 90° C.

After grinding, the novel dye is in the form of a dark powder, which readily dissolves in water to give a violet colour shade, and dyes polyamide fibres or wool from a weakly acid bath in bright, reddish-tinged violet shades with good fastness properties.

If the metallisation of the monoazo dye is carried out under the same conditions using 28 parts of crystalline nickel sulphate in place of copper sulphate, the corresponding 1:1 nickel complex forms and this dyes polyamide fibres in strongly reddish-tinged violet shades.

EXAMPLE 47

A solution of 39.6 parts of 1-hydroxy-2-aminobenzene-4-sulphonic acid N-5'-sulpho-1'-naphthylamide in 200 parts of water and 20 parts of 40% strength sodium hydroxide solution is mixed with 25 parts of 4 N sodium nitrite solution and this mixture is added dropwise, with stirring, to a mixture of 45 parts of 30% strength hydrochloric acid and 150 parts of ice-water.

The yellow suspension of the diazonium compound, which is thus obtained, is approximately neutralised with 15% strength sodium hydroxide solution and treated with a solution of 11.2 parts of 2-amino-3-hydroxypyridine in 100 parts of water. The suspension is rendered alkaline by introducing 15 parts of calcium hydroxide and the coupling reaction to give the violet monoazo dye of the following probable constitution starts immediately:

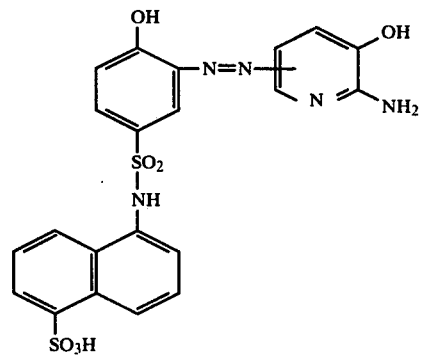

After the coupling reaction has ended, the dye formed is precipitated by acidifying the mixture with 50 parts of 30% strength hydrochloric acid and is isolated by filtration and washed with 5% strength hydrochloric acid.

The amount of filter paste which corresponds to 51.7 parts of the monoazo dye of the above constitution is stirred with 500 parts of hot water and brought into solution by adding 40% strength sodium hydroxide solution until there is a permanent alkaline reaction. 25 parts of copper sulphate pentahydrate in the form of a 20% strength solution are added dropwise, with stirring, at a temperature of 65° to 70° C., the pH always being kept within a range of 8 to 9 by adding 15% strength sodium hydroxide solution at the same time. The 1:1 copper complex of the monoazo dye forms immediately, the colour changing from red-violet to blue. As soon as the metallisation has ended, the complex dye is precipitated by adding sodium chloride, isolated by filtration, washed with dilute sodium chloride solution and dried in vacuo at 90° C.

After grinding, the novel dye is in the form of a dark powder, which readily dissolves in water to give a blue colour shade, and dyes polyamide fibres or wool from a weakly acid bath in sky blue shades with very good fastness properties.

If the metallisation of the monoazo dye is carried out under the same conditions using 28 parts of crystalline nickel sulphate in place of copper sulphate, the corresponding 1:1 nickel complex forms and this dyes polyamide fibres in fast, reddish-tinged blue shades.

Metallisation under the same conditions but with only 14 parts of crystalline nickel sulphate gives the 1:2 nickel complex, which dyes polyamide fibres from a weakly acid bath in fast, distinctly reddish-tinged blue shades.

EXAMPLE 48

51.7 parts of the monoazo dye obtained according to Example 47 are mixed to a paste with 300 parts of hot water and brought into solution by adding 40% strength sodium hydroxide solution until there is a permanent alkaline reaction. While maintaining a temperature of 80° to 85° C., 14.1 parts of crystalline cobalt-II sulphate in the form of a 25% strength solution are added, an alkaline reaction always being maintained by the dropwise addition of 15% strength sodium hydroxide solution. The 1:2 cobalt complex forms immediately, the colour changing from red-violet to green-blue, and after complete metallisation this complex is separated out by introducing sodium chloride and neutralising the mixture with 15% strength hydrochloric acid.

After filtering, washing with sodium chloride, drying and grinding, the novel complex dye is in the form of a dark powder which is readily soluble in water; it dyes polyamide fibres and wool in greenish-tinged blue shades with very good fastness to light.

EXAMPLE 49

A solution of 39.6 parts of 1-hydroxy-2-aminobenzene-4-sulphonic acid N-6'-sulphonaphthyl-2'-amide in 200 parts of water and 20 parts of 40% strength sodium hydroxide solution is mixed with 25 parts of 4 N sodium nitrite solution and this mixture is added dropwise, with stirring, to a mixture of 45 parts of 30% strength hydrochloric acid and 150 parts of ice-water.

The yellow suspension of the diazonium compound, which is thus obtained, is approximately neutralised with 15% strength sodium hydroxide solution and treated with a solution of 11.2 parts of 2-amino-3-hydroxypyridine in 100 parts of water. The suspension is rendered alkaline by introducing 15 parts of calcium hydroxide and the coupling reaction to give the dye of the following probable constitution starts instantaneously:

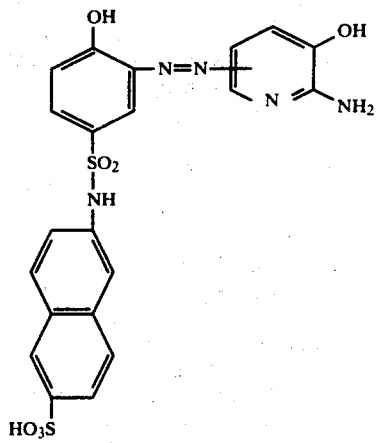

After the coupling reaction has ended, the dye formed is precipitated by acidifying the mixture with 50 parts of 30% strength hydrochloric acid and is isolated by filtration and washed with 50% strength hydrochloric acid.

The amount of filter paste which corresponds to 51.7 parts of the monoazo dye of the above constitution is stirred with 500 parts of hot water and brought into solution by adding 40% strength sodium hydroxide solution. 25 parts of copper sulphate pentahydrate in the form of a 20% strength solution are added dropwise, with stirring, at a temperature of 65° to 70° C., the pH always being maintained within a range of 8 to 9 by adding 15% strength sodium hydroxide solution at the same time. The 1:1 copper complex of the monoazo dye forms immediately, the colour changing from red-violet to blue. As soon as the metallisation has ended, the complex dye is precipitated by adding sodium chloride, isolated by filtration, washed with dilute sodium chloride solution and dried in vacuo at 90° C.

After grinding, the novel dye is in the form of a dark powder, which readily dissolves in water to give a blue colour shade, and dyes polyamide fibres or wool from a weakly acid bath in fast, blue shades.

If the metallisation of the monoazo dye is carried out under the same conditions using 28 parts of crystalline nickel sulphate in place of copper sulphate, the corresponding 1:1 nickel complex forms and this dyes polyamide fibres in fast, reddish-tinged blue shades.

In the table which follows, further diazo components are given in column I, the coupling components are given in column II, the metals used for forming the complex are given in column III and the colour shades which can be achieved on polyamide fibres or wool with the particular metal complexes are given in column IV.

| Nr. | I | II | III | IV |
|---|---|---|---|---|
| 1. | (structure with NH—SO₂, SO₃H, Cl, OH, NH₂) | (structure with OH, N, NH₂) | Cu | green-blue |
| 2. | " | " | Ni | blue |

-continued
| Nr. | I | II | III | IV |
|---|---|---|---|---|
| 3. | " | 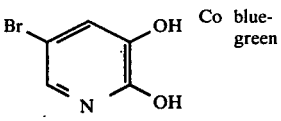 | Co | blue-green |
| 4. | " | " | Cu | blue |
| 5. | " | " | Ni | blue-grey |
| 6. | 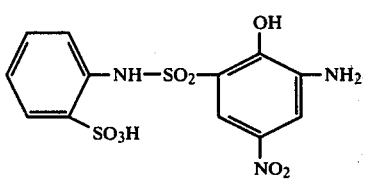 | 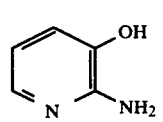 | Cu | blue |
| 7. | " | " | Ni | reddish-blue |
| 8. | 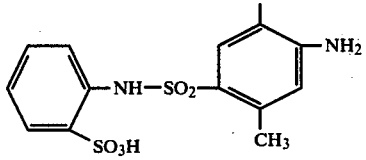 | " | Cu | blue |
| 9. | " | " | Ni | grey-blue |
| 10 | " | 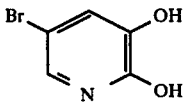 | Cu | blue |
| 11. | 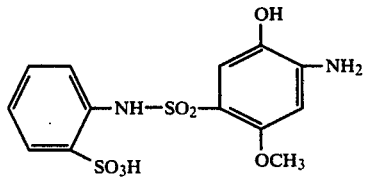 | 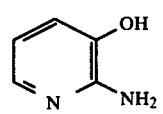 | Cu | green-blue |
| 12. | " | " | Ni | blue-violet |
| 13. | 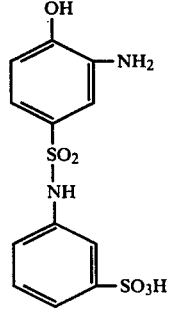 | " | Cu | grey-blue |
| 14. | " | " | Ni | violet |
| 15. | 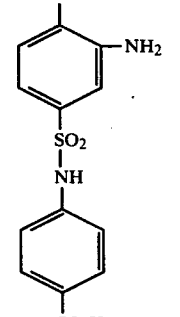 | " | Cu | grey-blue |
| 16. | " | " | Ni | violet |

-continued

| Nr. | I | II | III | IV |
|---|---|---|---|---|
| 17. | " | 5-bromo-pyridine with OH groups (Br, OH, OH on pyridine) | Cu | blue-grey |
| 18. | " | " | Ni | violet |
| 19. | 3-amino-4-hydroxyphenyl-SO2-NH-(2-chloro-5-sulfophenyl) | 2-amino-3-hydroxypyridine | Cu | blue |
| 20. | " | " | Ni | red-blue |
| 21. | 3-amino-5-nitro-4-hydroxyphenyl-SO2-NH-(2-methoxy-5-sulfophenyl) | " | Cu | green-blue |
| 22. | " | " | Ni | blue |
| 23. | HO3S-(2-chlorophenyl)-NH-SO2-(2-chloro-4-amino-5-hydroxyphenyl) | " | Cu | blue |
| 24. | " | " | Ni | red-blue |
| 25. | " | " | Co | green-blue |
| 26. | 2-amino-benzoic acid (COOH, NH2) with SO2-NH-(4-methoxy-2-sulfophenyl) | " | Cu | violet |
| 27. | " | " | Ni | red-violet |
| 28. | 2-amino-benzoic acid (COOH, NH2) with SO2-NH-(2-chloro-5-sulfophenyl) | " | Cu | violet |
| 29. | " | " | Ni | red-violet |

| Nr. | I | II | III | IV |
|---|---|---|---|---|
| 30. | (structure: 2-amino-benzoic acid with COOH, NH2; linked via HN-SO2 to a benzene ring with CH3 and SO3H) | " | Cu | red-violet |
| 31. | " | " | Ni | red-violet |
| 32. | (structure: 2-amino-phenol with OH, NH2; linked via SO2-NH to a naphthalene with SO3H) | " | Cu | blue |
| 33. | " | " | Ni | violet |
| 34. | " | " | Co | green-blue |
| 35. | (structure: 2-amino-benzoic acid with COOH, NH2; linked via HNO2S to a naphthalene with SO3H) | " | Cu | violet |
| 36. | " | " | Ni | red-violet |
| 37. | (structure: 4-amino-2-nitrophenol with OH, NH2, NO2; linked via SO2-NH to a naphthalene with OCH3 and HO3S) | " | Cu | green-blue |
| 38. | " | " | Ni | blue |
| 39. | " | " | Cu | blue |
| | (structure: 2-amino-phenol with OH, NH2; linked via SO2-N(CH3) to a benzene ring with SO3H) | | | |

| Nr. | I | II | III | IV |
|---|---|---|---|---|
| 40. | " | " | | Ni red-blue |

EXAMPLE 50

59.0 parts of the monoazo dye obtainable according to Example 45 are stirred with 1,000 parts of water at 80° to 85° C. After neutralising the suspension, which initially has an acid reaction, with 15% sodium hydroxide solution, 7.5 parts of diethylamine are added dropwise. The red-violet reaction mixture is then stirred, while boiling under reflux, until no further unchanged starting dye can be detected and during this period the colour shade of the solution changes to orange-brown.

In order to separate out the novel monoazo dye of the probable constitution

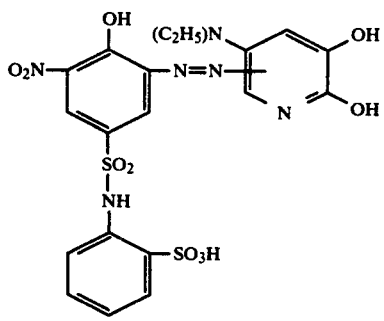

the reaction mixture is treated with sodium chloride and the dye which is precipitated is isolated by filtration and washed with dilute sodium chloride solution.

If 58.2 parts of the resulting monoazo dye are metallised in accordance with the instructions of Example 45 with 25 parts of copper sulphate pentahydrate, the corresponding 1:1 copper complex forms and this dyes polyamide fibres from a weakly acid bath in fast blue-grey shades.

If the metallisation is carried out with 28 parts of nickel sulphate heptahydrate instead of with copper sulphate, the 1:1 nickel complex forms, and polyamide fibres can be dyed in fast, grey-blue shades using this complex.

EXAMPLE 51

59.0 parts of the monoazo dye accessible according to Example 45 are mixed to a paste in 1,000 parts of water at 50° C. After adding 24 parts of sodium bicarbonate and 20 parts of sodium p-toluenesulphinate, the reaction mixture is warmed to 90° to 95° C. and stirred under reflux at this temperature until no further starting dye can be detected. During this period, the colour shade changes from red-violet to violet-blue. The novel dye of the probable constitution

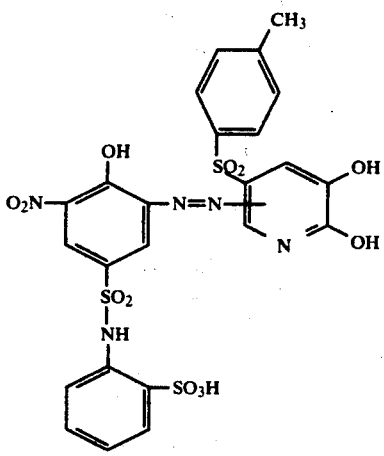

crystallises out in the course of the reaction and is completely separated out by adding sodium chloride, isolated by filtration and washed with dilute sodium chloride solution.

If the resulting dye paste is metallised in accordance with the instructions of Example 45 using 25 parts of copper sulphate pentahydrate or 28 parts of nickel sulphate heptahydrate, the corresponding 1:1 copper complex or, respectively, 1:1 nickel complex forms and this dyes polyamide fibres or wool from a weakly acid bath in fast, strongly greenish-tinged or, respectively, reddish-tinged blue shades.

EXAMPLE 52

66.5 parts of the monoazo dye obtainable according to Example 51 are metallised in accordance with the instructions of Example 48 using 14 parts of crystalline cobalt-II sulphate.

The 1:2 cobalt complex obtained in this way dyes polyamide fibres from a weakly acid bath in full, bluish-tinged green shades with very good fastness properties.

EXAMPLE 53

A solution of 34.4 parts of 1-hydroxy-2-aminobenzene-4-sulphonic acid N-3'-sulphophenylamide in 200 parts of water and 20 parts of 40% strength sodium hydroxide solution is mixed with 25 parts of 4 N sodium nitrite solution and this mixture is added dropwise, with stirring, to a mixture of 45 parts of 30% strength hydrochloric acid and 150 parts of ice-water.

The yellow suspension of the diazonium compound, which is thus obtained, is approximately neutralised with 15% strength sodium hydroxide solution and treated with a solution of 14.6 parts of 2,3-dihydroxy-5-chloropyridine in 100 parts of water. The suspension is rendered alkaline by introducing 15 parts of calcium hydroxide and the coupling reaction to give the violet monoazo dye of the following probable constitution starts immediately:

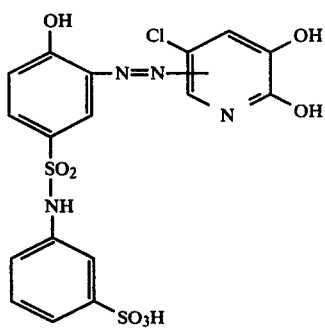

After the coupling reaction has ended, the dye formed is precipitated by acidifying the mixture with 50 parts of 30% strength hydrochloric acid and is isolated by filtration and washed with 5% strength hydrochloric acid.

The amount of filter paste corresponding to 50.05 parts of the monoazo dye of the above constitution is stirred with 500 parts of hot water and brought into solution by adding 40% strength sodium hydroxide solution until there is a permanent alkaline reaction. 25 parts of copper sulphate pentahydrate in the form of a 20% strength solution are added dropwise, with stirring, at a temperature of 65° to 70° C., the pH always being kept within a range of 8 to 9 by adding 15% strength sodium hydroxide solution at the same time. The 1:1 copper complex of the monoazo dye forms immediately, the colour changing from red-violet to blue. As soon as the metallisation has ended, the complex dye is precipitated by adding sodium chloride, isolated by filtration, washed with dilute sodium chloride solution and dried in vacuo at 90° C.

After grinding, the novel dye is in the form of a dark powder, which readily dissolves in water to give a blue colour shade, and dyes polyamide fibres or wool from a weakly acid bath in bright blue-grey shades with very good fastness properties.

EXAMPLE 54

50.05 parts of the monoazo dye prepared according to Example 53 are stirred with 1,000 parts of water at 50° C. and 30 parts of 20% strength sodium carbonate solution. The red-violet solution is treated with 11 parts of 2-mercaptophenol and then further stirred at 70° to 75° C. until the starting dye has been consumed. The novel dye of the probable constitution

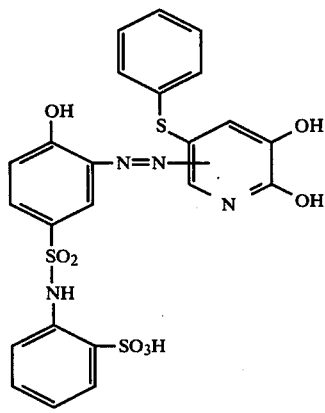

is precipitated from the red-brown reaction solution by adding sodium chloride and is isolated by filtration and washed with dilute sodium chloride solution.

When applied from a weakly acid bath, the 1:1 copper complex of the novel dye, which is obtained by the procedure described in Example 53, gives fast greenish-tinged blue dyeings on polyamide fibres or wool; the analogous 1:1 nickel complex gives reddish-tinged blue shades.

EXAMPLE 55

51.0 parts of the monoazo dye which is obtained from diazotised 6-nitro-1-hydroxy-2-amino-4-sulphonic acid N-2'-sulphophenylamide and 2-amino-3-hydroxypyridine, and is accessible according to Example 42, are stirred with 400 parts of ethylene glycol monomethyl ether. 32 parts of bromine in the form of a 2 molar solution in the same solvent as above are added slowly dropwise to the resulting suspension, at room temperature. The suspension temporarily changes to a clear solution, the colour changing from blue-violet to red, and after a short time the novel brominated dye crystallises out of this solution virtually completely. As soon as no further starting dye can be detected by chromatography, the novel dye is isolated by filtration and washed, first with the same solvent and then with dilute sodium chloride solution.

The filter paste of the brominated dye is mixed with 600 parts of water at 70° C. and 20 parts by volume of a 30% strength sodium hydroxide solution. A solution of 27.5 parts of crystalline copper sulphate, 15.0 parts of tartaric acid and 20 parts of sodium hydroxide in 300 parts of water is added to the resulting violet-blue solution at the same temperature. The 1:1 copper complex of the dye forms instantaneously, the colour changing to green-blue; it is separated out by adding sodium chloride, isolated by filtration, washed with dilute sodium chloride solution and dried. The dye, which after grinding is obtained in the form of a dark blue powder, dyes polyamide fibres from a weakly acid bath in intense, bright green-blue shades with good fastness properties, especially outstanding fastness to light.

EXAMPLE 56

If the corresponding 1:1 copper complex is used in place of the starting dye mentioned in the preceding example and in other respects the same procedure is maintained, a brominated complex dye which is a single compound and has a markedly more greenish-tinged colour shade than the starting material is formed; according to chromatography, and coloristically, this complex dye is identical to the 1:1 copper complex, obtained by subsequent metallisation, of the preceding example.

EXAMPLE 57

46.5 parts of the monoazo dye obtained from diazotised 1-hydroxy-2-aminobenzene-5-sulphonic acid N-2'-sulphophenylamide and 2-amino-3-hydroxypyridine and mentioned in Example 39 are stirred with 300 parts of dimethylformamide. A solution of 48 parts of bromine in 200 parts of dimethylformamide is added slowly dropwise at room temperature. A novel dye, which is a single compound and differs from the starting dye in that the $R_f$ value on chromatography is markedly greater and there is a bathochromic shift in the shade, forms, the temperature rising to about 30° C. and the colour changing from blue-violet to dark red. As soon as the bromination has ended, the reaction solution is added dropwise, with stirring, to 1,000 parts of ice-water. The dye, which precipitates completely, is isolated by filtration and washed with ice-water.

The filter paste of the brominated dye is treated with 800 parts of water and 20 parts by volume of a 30% strength sodium hydroxide solution. After warming to 80° C., a solution of 14 parts of crystalline cobalt sulphate, 15 parts of tartaric acid and 20 parts of sodium hydroxide in 400 parts of water at 70° C. is poured in. The 1:2 cobalt complex of the brominated dye forms, the colour changing to dark green. After the metallisation has ended, the complex dye is separated out completely by adding sodium chloride and is isolated by filtration, washed with dilute sodium chloride solution, dried and ground. When applied from a weakly acid dyebath, the novel dye gives blue-grey shades, which are fast to light and to wet processing, on polyamide fibres and wool.

If, for bromination, the corresponding 1:2 cobalt complex is used in place of the metal-free monoazo dye, a bromine-containing complex dye, which is identical to the dye described above, forms when the same procedure is used.

EXAMPLE 58

35.8 parts of the 1:1 chromium complex of the azo dye obtained from diazotised 5-nitro-2-amino-1-hydroxybenzene and 2-amino-naphthalene, which complex is obtainable by a known process and contains 1 atom of chromium per molecule of monoazo dye, are stirred, together with 51.0 parts of the monoazo dye which is obtained from diazotised 6-nitro-1-hydroxy-2-aminobenzene-4-sulphonic acid N-2'-sulphophenylamide and 2-amino-3-hydroxypyridine, and is accessible according to Example 42, in a mixture of 500 parts of water and 500 parts of isopropanol. The pH of the suspension is adjusted to 7 to 8 by adding 20 parts by volume of concentrated sodium hydroxide solution and the mixture is then stirred at 90° to 95° C. until the two starting dyes can no longer be detected. The chromium mixed complex, which is a single compound and is present in a clear solution, is precipitated, after distilling off the isopropanol, by adding sodium chloride, isolated by filtration and, after washing with sodium chloride solution, dried in vacuo. After grinding, the dye is in the form of a dark blue powder, which is readily soluble in water, and dyes wool or polyamide fibres from a dyebath containing ammonium sulphate in full bluish-tinged dark green shades with good fastness properties.

EXAMPLE 59

46.5 parts of the dye which is obtained from diazotised 1-hydroxy-2-aminobenzene-5-sulphonic acid N-2'-sulphophenylamide and 2-amino-3-hydroxypyridine, and is obtainable in accordance with the instructions of Example 39, are suspended in 400 parts of water. After introducing 24 parts of chromium sulphate containing 35.2% of $Cr_2O_3$, the pH value of the reaction mixture is adjusted to 2.5 by adding dilute sulphuric acid and the mixture is then stirred under reflux until all the starting dye has been converted into the corresponding 1:1 chromium complex. The complex dye is precipitated completely by adding sodium chloride and isolated by filtration. The resulting filter paste is stirred with 30.9 parts of the monoazo dye which is obtained from diazotised 5-nitro-2-amino-1-hydroxybenzene and 2-hydroxynaphthalene, and is obtainable in a known manner, in 1,000 parts of water. The pH of the suspension is adjusted to 8 to 9 by adding sodium hydroxide solution and the mixture is then stirred at 90° to 95° C. until the two starting dyes can no longer be detected. The mixed complex, which is a single compound and is present in solution, is isolated by salting out and filtering.

On wool or polyamide fibres, full, fast grey-blue shades are obtained with the novel complex dye, applied from a weakly acid bath.

Instructions for dyeing polyamide fibres:

100 parts of a fabric made of nylon 6,6 are introduced, at a temperature of 50° to 60° C., into a dyebath which contains, per 3,000 parts of fully desalinated water, 1 part of the 1:1 copper complex mentioned in Example 42, 3 parts of ammonium acetate and the amount of 40% strength acetic acid required to obtain a pH value of 5. The dyebath is heated to the boil in the course of half an hour and dyeing is then carried out for one hour at the boil. After cooling to 80° C., rinsing and drying, the polyamide fabric is dyed in a level, sky blue.

Instructions for dyeing wool knitting yarn 100 parts of pre-wetted wool knitting yarn are introduced, at 50° C., into a dyebath which contains, per 3,000 parts of water, 5 parts of ammonium sulphate and 1 part of the chromium complex described in Example 58. The dyebath is heated to the boil in the course of half an hour and dyeing is carried out for a further one hour at the boil. After cooling to 80° C., the yarn is rinsed warm and cold. The dried wool yarn is dyed in a full, bluish-tinged dark green shade.

Instructions for dyeing wool fabric 100 parts of wool fabric are introduced, at a temperature of 50° to 60° C., into a dyebath which comprises 3,000 parts of water, 5 parts of 40% strength acetic acid, 10 parts of sodium sulphate, 2 parts of the ethylene oxide addition product prepared as described below and 1 part of the 1:2 cobalt complex mentioned in Example 4. After the bath has been heated to the boil in the course of half an hour, dyeing is carried out for a further one hour at the boil. After rinsing and drying, a level, green-blue dyeing results.

The ethylene oxide addition product can be prepared as follows:

100 parts of technical grade oleylamine are treated with 1 part of finely divided sodium and the mixture is heated to 140° C., after which ethylene oxide is passed in at 135° to 140° C. As soon as the ethylene oxide is taken up rapidly, the reaction temperature is lowered to 120° to 125° C. and further ethylene oxide is passed in until 113 parts of ethylene oxide have been taken up. The reaction product obtainable in this way dissolves in water to give a virtually clear solution.

What is claimed is:

1. A 1:1 or 1:2 copper, nickel, chromium or cobalt metal complex dye of an azo compound of the formula

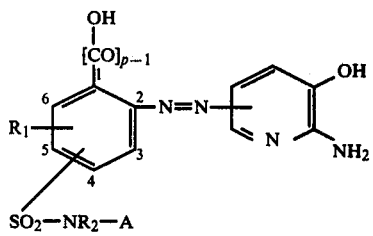

wherein
- A is carboxyphenyl or sulfophenyl which are unsubstituted or substituted by chloro, methyl, methoxy or acetylamino;
- p is 1 or 2;
- $R_1$ is hydrogen; chloro; bromo; nitro; $C_1$–$C_4$ alkyl; $C_1$–$C_4$-alkoxy; $C_1$–$C_4$ alkanoylamino; $C_1$–$C_4$ alkoxycarbonylamino; or phenoxy which is unsubstituted or substituted by chloro, bromo, methyl, methoxy or nitro;
- $R_2$ is hydrogen or $C_1$–$C_4$ alkyl; and with the proviso that one of —$R_1$ and —$SO_2NR_2$—A is in the 4-position and the other is in the 5- or 6-position.

2. A metal complex dye according to claim 1, which is a 1:1 copper or nickel metal complex dye.

3. A metal complex dye according to claim 1, which is a 1:2 nickel or cobalt metal complex dye.

4. A metal complex dye according to claim 1, which is a 1:1 chromium complex dye.

5. A metal complex dye according to claim 1, wherein p is 1.

6. A 1:1 copper complex dye according to claim 1, of an azo compound of the formula

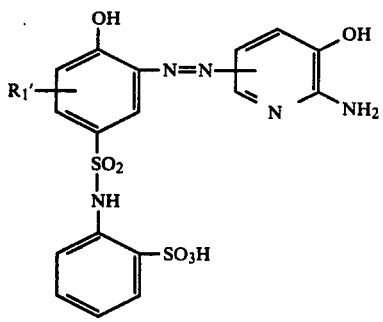

wherein $R_1'$ is hydrogen, chloro, bromo, methyl, methoxy or nitro.

* * * * *